United States Patent
Lewallen et al.

(10) Patent No.: US 10,101,544 B2
(45) Date of Patent: Oct. 16, 2018

(54) FIBER OPTIC CONNECTOR ASSEMBLIES WITH ROTATABLE PIVOT ARM

(71) Applicant: Corning Optical Communications LLC, Hickory, NC (US)

(72) Inventors: Christopher Paul Lewallen, Hudson, NC (US); James Phillip Luther, Hickory, NC (US); Brian Keith Rhoney, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 123 days.

(21) Appl. No.: 15/219,744

(22) Filed: Jul. 26, 2016

(65) Prior Publication Data

US 2018/0031783 A1 Feb. 1, 2018

(51) Int. Cl.
*G02B 6/38* (2006.01)

(52) U.S. Cl.
CPC .......... *G02B 6/3885* (2013.01); *G02B 6/387* (2013.01); *G02B 6/3821* (2013.01); *G02B 6/3829* (2013.01); *G02B 6/3878* (2013.01)

(58) Field of Classification Search
None
See application file for complete search history.

(56) References Cited

U.S. PATENT DOCUMENTS

| | | | |
|---|---|---|---|
| 5,923,802 A | 7/1999 | Giebel et al. | |
| 6,637,949 B2 * | 10/2003 | Loch | G02B 6/4202 385/53 |
| 6,885,798 B2 | 4/2005 | Zimmel | |
| 7,785,018 B2 | 8/2010 | Jones et al. | |
| 9,086,546 B2 | 7/2015 | Jones | |
| 2001/0043775 A1 * | 11/2001 | Shirakawa | G02B 6/3829 385/59 |
| 2010/0329621 A1 | 12/2010 | Makrides-Saravanos et al. | |
| 2011/0129186 A1 * | 6/2011 | Lewallen | G02B 6/3825 385/59 |
| 2015/0226922 A1 | 8/2015 | Childers | |

OTHER PUBLICATIONS

"Fiber Optic Products," Jan. 22, 2010, XP055150137, http://www.molex.com/catalog/web_catalog/pdfs/Q.pdf [retrieved on Oct. 30, 2014], 28 pages.

Intel, "MXC—Enabling 21st Century Connectivity," First MXC Adopters Meeting, Mar. 11, 2014, http://www.intel.com/content/dam/www/public/us/en/documents/intel-research/mxc-spring-2014-adopters.pdf, 31 pages.

* cited by examiner

*Primary Examiner* — Chad H Smith
(74) *Attorney, Agent, or Firm* — Michael E. Carroll, Jr.

(57) ABSTRACT

Fiber optic connector assemblies and subassembly are disclosed. In one embodiment, a fiber optic connector subassembly includes a body and a pivot arm. The body includes a first body shell and a second body shell having a joint portion. The first body shell is coupled to the second body shell. The pivot arm is rotatably coupled to the joint portion. In another embodiment, a fiber optic connector assembly includes a plurality of cable assemblies, a housing, a body, and a pivot arm. Each cable assembly includes a fiber optic cable having a plurality of optical fibers, and a ferrule. The plurality of optical fibers is coupled to the ferrule. The housing receives the ferrules of the plurality of cable assemblies. The body is coupled to the housing. The pivot arm is rotatably coupled to the body. The plurality of optical fibers is disposed within the pivot arm.

19 Claims, 18 Drawing Sheets

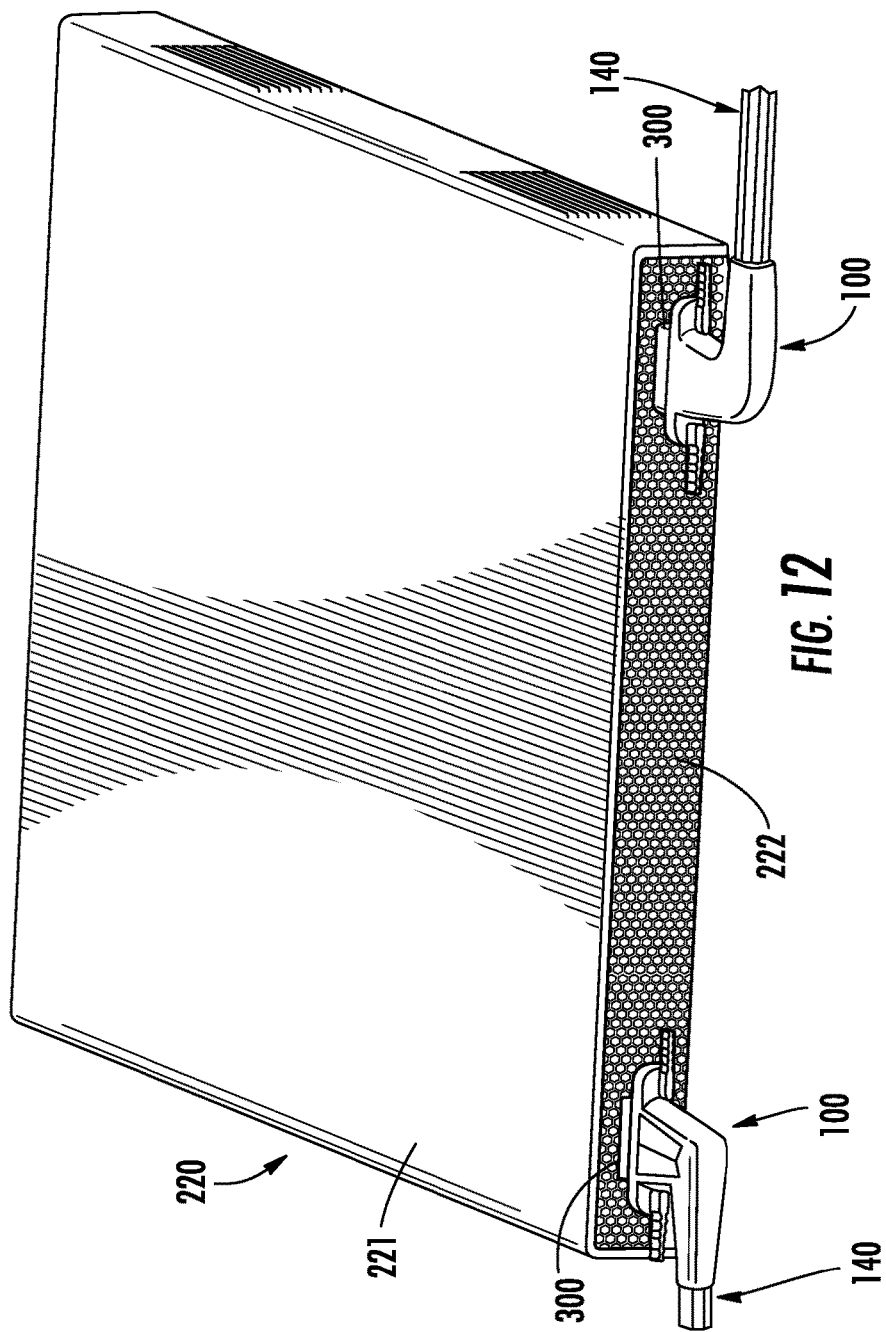

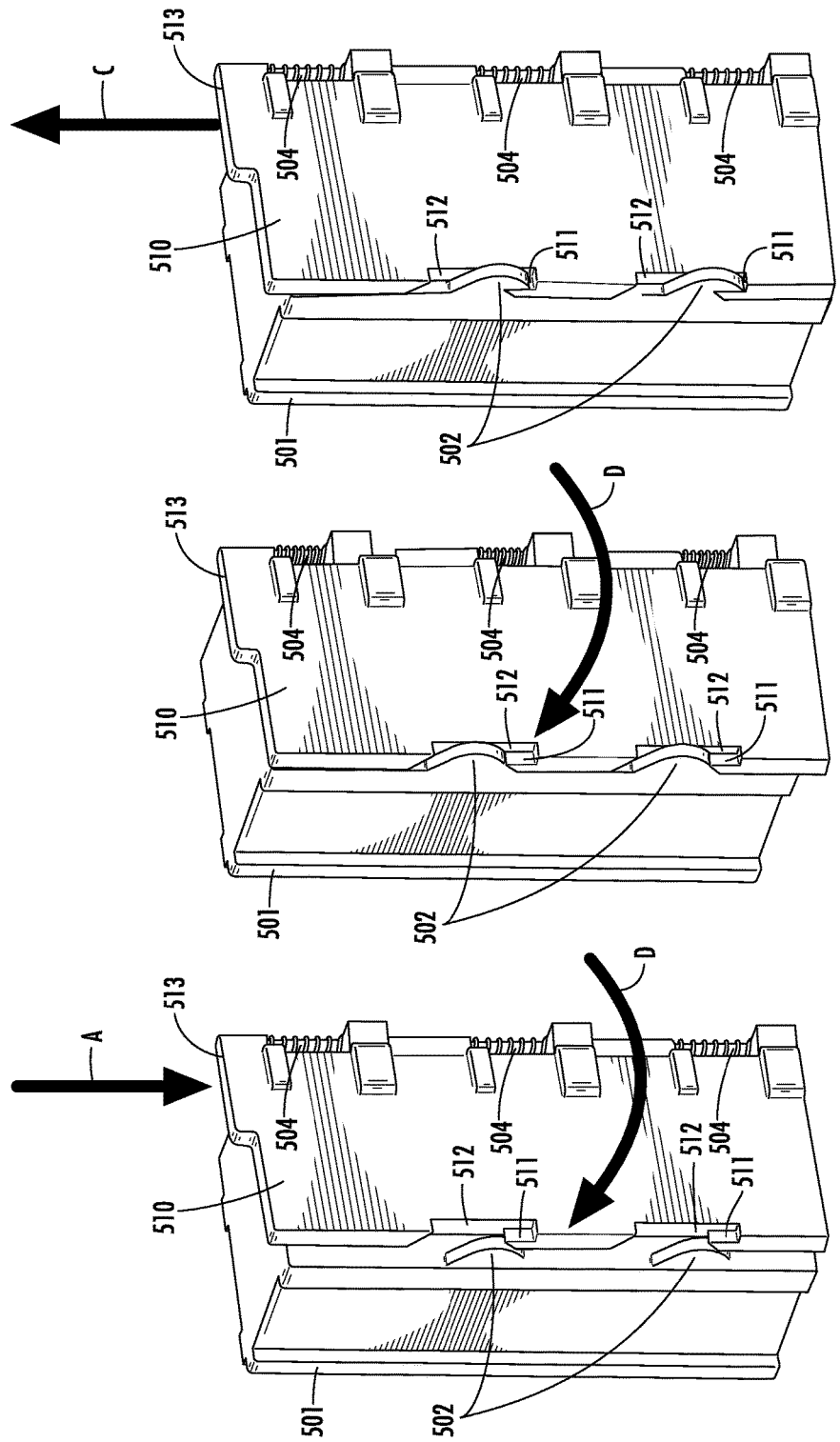

FIBER OPTIC CONNECTOR ASSEMBLIES WITH ROTATABLE PIVOT ARM

BACKGROUND

The present disclosure generally relates to optical connectors and, more particularly, to fiber optic connector assemblies capable of optically coupling a plurality of fibers in multiple feed directions.

Benefits of optical fiber include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connections are employed in both optical cable assemblies and electronic devices to provide an optical-to-optical connection wherein optical signals are passed between an optical cable assembly and an electronic device.

Datacenters often employ rack-based routers or other computing equipment that require optical connection of a fiber optic connector that terminates a plurality of optical fibers. The number of optical fibers desired to be coupled to a router or other computing equipment is increasing as optical networks gain more widespread use. In some cases, more than three hundred optical fibers are desired to be included in a single optical connector for optical connector to a mated receptacle within a router or other computing equipment. Such a large number of optical fibers present significant manufacturing challenges as it may be nearly impossible to install all of the optical fibers into a single connector. Problems with the actual processing of such a large array of optical fibers in addition to the tolerance stack-up of connector-to-adapter mating would mean a higher probability of product failure both during manufacturing of the fiber optic connector assembly and in the field.

Accordingly, alternative fiber optic connector assemblies capable of terminating a large number of optical fibers are desired.

SUMMARY

Embodiments are directed to fiber optic connector assemblies capable of optically coupling a large number of optical fibers, such as, without limitation, over three hundred optical fibers in a single optical connector assembly. In embodiments, the body of the fiber optic connector assembly is rotatable such that the feed direction of the fiber optic connector assembly may be changed in the field depending on the application. In this manner, only one connector is needed to be manufactured for multiple feed directions, thereby saving manufacturing and inventory costs.

In the embodiments described herein, the optical fibers are bundled into multiple groups that are terminated by a plurality of ferrules to define a plurality of cable assemblies. The ferrules, as well as other components of the cable assemblies, are ganged together to form a single, individual connector used to optically couple all of the optical fibers to a mated receptacle.

In this regard, in one embodiment, a fiber optic connector subassembly includes a body and a pivot arm. The body includes a first body shell and a second body shell having a joint portion. The first body shell is coupled to the second body shell. The pivot arm is rotatably coupled to the joint portion of the second body shell.

In another embodiment, a fiber optic connector assembly includes a plurality of cable assemblies, a housing, a body, and a pivot arm. Each cable assembly includes a fiber optic cable having a plurality of optical fibers, and a ferrule. The plurality of optical fibers is coupled to the ferrule. The housing receives the ferrules of the plurality of cable assemblies. The body is coupled to the housing such that at least a portion of the plurality of cable assemblies is disposed within the body. The pivot arm is rotatably coupled to the body. The plurality of optical fibers for the cable assemblies is disposed within the pivot arm.

In yet another embodiment, a fiber optic connector assembly includes a plurality of cable assemblies, a housing, a body, and a pivot arm. Each cable assembly includes a fiber optic cable having a plurality of optical fibers, a crimp body, a spring disposed within the crimp body, wherein the plurality of optical fibers of the cable assembly is disposed within the crimp body and the spring, and a ferrule, wherein the plurality of optical fibers is coupled to the ferrule. The housing receives the ferrules and portions of the crimp bodies of the plurality of cable assemblies. The body is coupled to the housing and includes a first body shell, and a second body shell. The second body shell includes at least one cylindrical portion, and the first body shell is coupled to the second body shell. The pivot arm is rotatably coupled to the at least one cylindrical portion of the second body shell. The plurality of optical fibers for the cable assemblies is disposed within the pivot arm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

FIG. 12 is a perspective view of an example router with two example fiber optic connector assemblies coupled thereto according to one or more embodiments described and illustrated herein;

FIGS. 16A-16C are perspective views of an example process to close a shutter door of the example receptacle depicted in FIGS. 15A-15C according to one or more embodiments described and illustrated herein.

DETAILED DESCRIPTION

Embodiments are directed to fiber optic connector assemblies capable of optically coupling a large number of optical fibers, such as, without limitation, over three hundred optical fibers in a single optical connector assembly. More particularly, embodiments are directed to high density, ganged fiber optic connector assemblies and corresponding shielded receptacles.

In the embodiments described herein, the optical fibers are bundled into multiple groups that are terminated by a plurality of ferrules to define a plurality of cable assemblies. The ferrules, as well as other components of the cable assemblies, are ganged together to form a single, individual connector used to optically couple all of the optical fibers to a mated receptacle.

In embodiments, the body of the fiber optic connector assembly is rotatable such that the feed direction of the fiber optic connector assembly may be changed in the field depending on the application. In this manner, only one connector is needed to be manufactured for multiple feed directions, thereby saving manufacturing and inventory costs.

The ganged fiber optic connector assembly connector mates to a ganged adapter or receptacle have a corresponding number of lensed ferrules. In some embodiments, the ganged adapter or receptacle includes a shutter that remains in a closed position until the fiber optic connector assembly is inserted and then swings away during insertion. Upon removal the shutter automatically closes. Rib features on the shutter door may be provided to interact with channel features on the fiber optic connector assembly for coarse alignment of the fiber optic connector assembly to the adapter or receptacle. Further rib features within the adapter or receptacle also interact with corresponding channel features to complete the coarse alignment of the connector housing to the adapter housing.

Various embodiments of fiber optic connector assemblies and fiber optic connector sub-assemblies are described in detail below.

Figure 1:
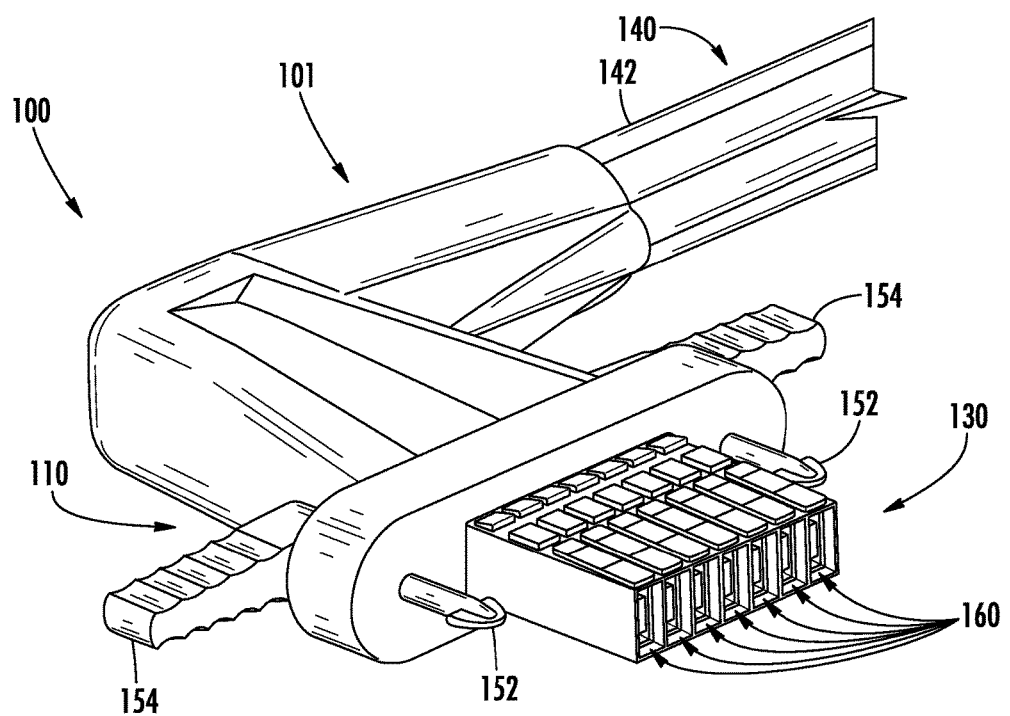
FIG. 1 is a perspective view of an example fiber optic connector assembly according to one or more embodiments described and illustrated herein.

Referring now to FIG. 1, an example fiber optic connector 100 is schematically illustrated in a perspective view. The example fiber optic connector 100 generally comprises a body 110, a rotatable pivot arm 101 coupled to the body 110, a housing 130, and a plurality of cable assemblies 160 disposed within the rotatable pivot arm 101, the body 110, and the housing 130. The plurality of cable assemblies 160 are provided in an outer jacket 142 of a fiber optic cable 140. The fiber optic connector 100 further comprises locking pins 152 and latches 154 to secure the fiber optic connector 100 to a mated receptacle.

Each individual cable assembly 160 includes a plurality of optical fiber sub-units 144. Each optical fiber sub-unit comprises a plurality of individual optical fibers 145 that are disposed within an outer jacket, such as a buffer tube. The fiber optic connector assembly 100 bundles the plurality of cable assemblies 160 into a larger connector assembly to optically connect a larger number of optical fibers 145 over a single optical cable assembly 160. In this manner, the fiber optic connector assembly 100 is a multiple ferrule mass optical fiber interconnect.

As an example and not a limitation, seven cable assemblies 160 may be provided in the housing 130, with each individual cable assembly 160 having forty-eight optical fiber sub-units 144, each having twelve optical fibers 145. Thus, in this example, the fiber optic connector assembly 100 provides for the optical connection of three-hundred and thirty-six individual optical fibers 145. It should be understood that more or fewer cable assemblies 160, optical fiber sub-units 144, and/or optical fibers 145 may be provided.

The housing 130, which maintains ferrules 161 of the plurality of cable assemblies 160, is insertable into a mated adapter receptacle to provide for optical connection between the optical fibers of the fiber optic connector assembly 100 and the mated adapter receptacle.

Figure 2:
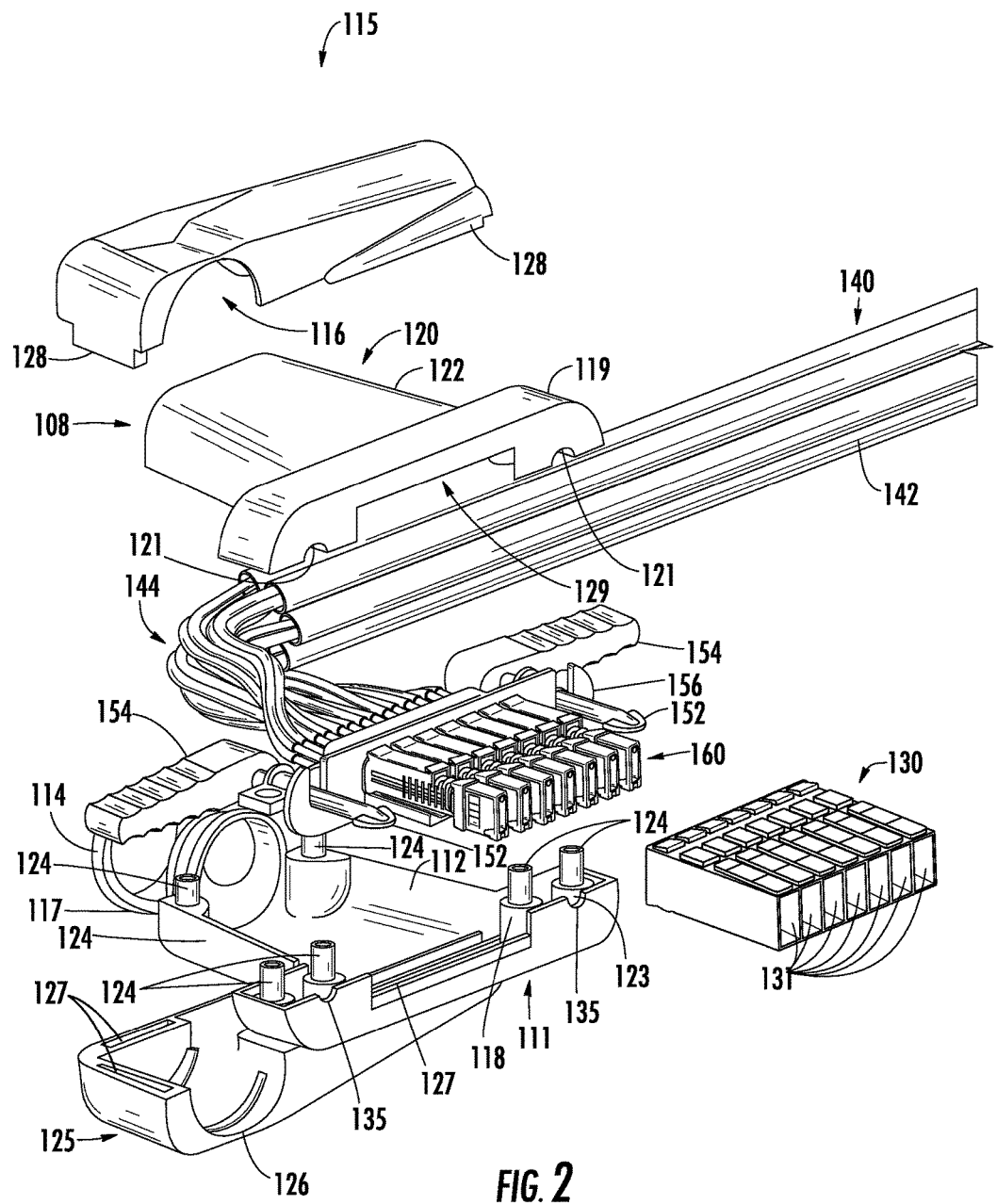
FIG. 2 is an exploded perspective view of the example fiber optic connector assembly illustrated in FIG. 1 according to one or more embodiments described and illustrated herein.
Figure 3:
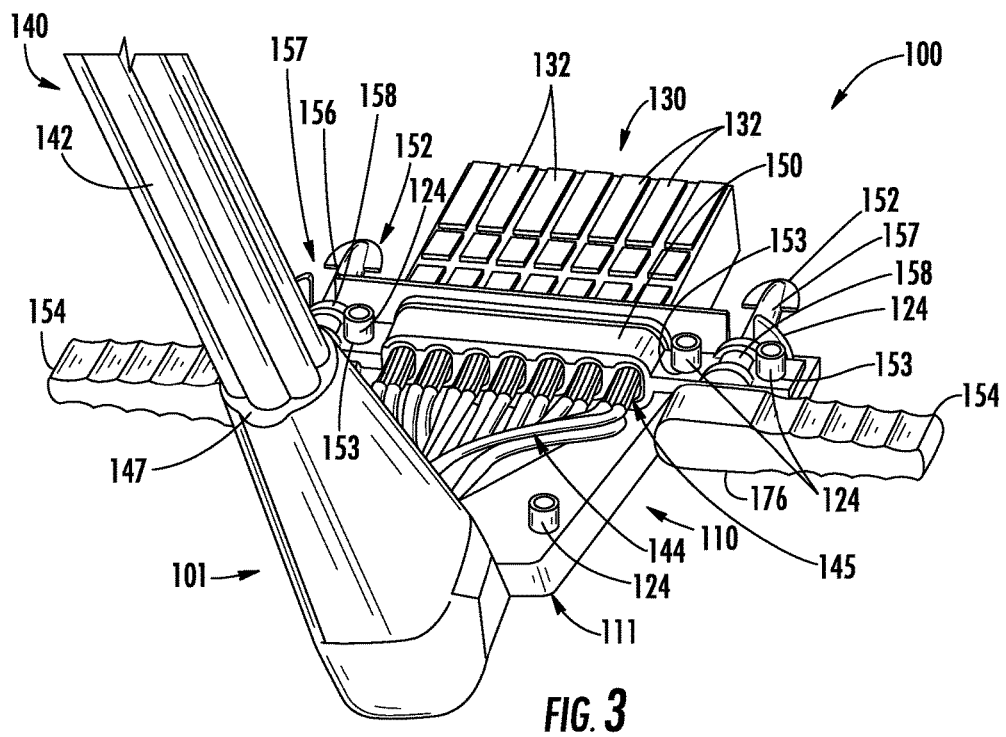
FIG. 3 is an exploded perspective view of the example fiber optic connector assembly illustrated in FIG. 1 with a pivot arm in a neutral position according to one or more embodiments described and illustrated herein.
Figure 4:
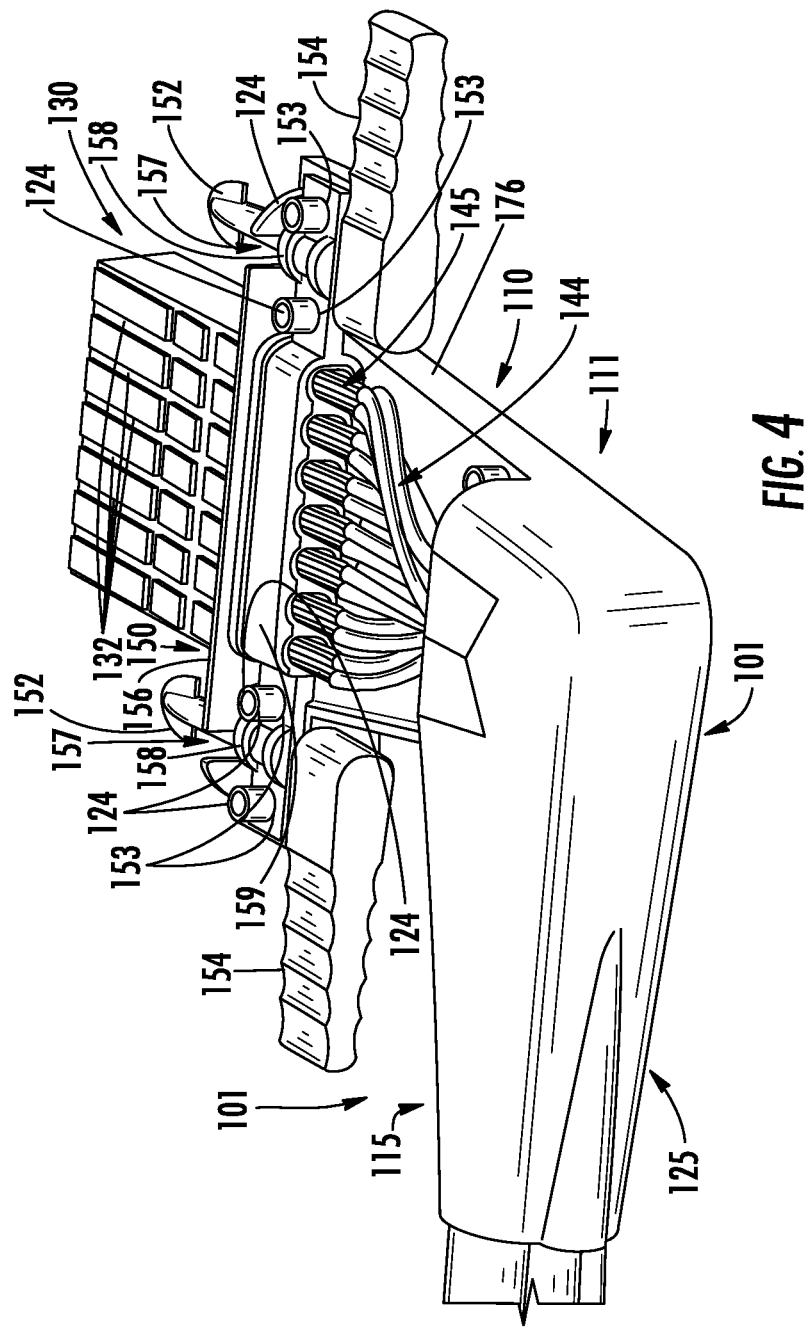
FIG. 4 is a rear perspective view of the example fiber optic connector assembly illustrated in FIG. 1 in a partially assembled state according to one or more embodiments described and illustrated herein.

Referring now to FIGS. 1-4, the components of the example fiber optic connector assembly 100 is described in greater detail. FIG. 2 is an exploded front perspective view of the fiber optic connector assembly 100. FIG. 3 is a partially assembled, rear perspective view of the fiber optic connector assembly 100 with the pivot arm 101 in a neutral position. FIG. 4 is a partially assembled, rear perspective view of the fiber optic connector assembly 100 with the pivot arm 101 in a first position.

The pivot arm 101 is rotatable with respect to the body 110 so that the fiber optic connector assembly 100 may be connected to a mated component in multiple orientations without requiring an individual, unique connector assembly for each orientation. The pivot arm 101 and the body 110 define a fiber optic connector subassembly. The pivot arm 101 and the body 110 may be configured in a variety of ways. In the illustrated embodiment, the body 110 comprises a first body shell 108 coupled to a second body shell 111, and the pivot arm 101 comprises a first pivot arm shell 115 and a second pivot arm shell 125.

The second body shell 111 includes a flange portion 123, a body portion 112, and at least one cylindrical portion, which, in the illustrated example, comprises a first cylindrical portion 114 and a second cylindrical portion 117. The at least one cylindrical portion provides a circular surface upon which the pivot arm 101 may rotate with respect to the body 110. In this manner, the at least one cylindrical portion provides a joint portion for the pivot arm 101. It should be understood that more or fewer cylindrical portions than the illustrated first and second cylindrical portions 114, 117 may be provided. It should also be understood that other joint portion configurations may be provided, such as a ball and socket configuration that allows the pivot arm 101 to rotate with respect to the body 110.

Referring specifically to FIG. 2 and generally to FIGS. 1, 3 and 4, the body portion 112 of the second body shell 111 defines a recess that maintains the plurality of optical fiber sub-units 144. As shown in FIG. 2, the width of the body portion 112 may increase from a fiber entrance end toward the flange portion 123 to accommodate the fanning out of the optical fiber sub-units 144 and the optical fibers 145.

The body portion 112 and the flange portion 123 of the second body shell 111 each include engagement features configured to mate with the corresponding engagement features of the first body shell 108. In this illustrated example, the engagement features of the second body shell 111 are configured as posts 124, while the engagement features of the first body shell 108 are configured as bores (not visible). Any number of posts may be provided at any location of the second body shell 111. Further, the first body shell 101 may include the posts while the second body shell 111 may include the bores. Alternatively, each of the first body shell 101 and the second body shell 111 may include both posts and bores.

It should be understood that other engagement feature configurations may be provided. The first body shell 101 may be coupled to the second body shell 111 by a snap or interference fit, and/or by the use of an appropriate adhesive.

The plurality of optical fiber sub-units 144 of the cable assemblies 160 is routed through the second cylindrical portion 117 in the illustrated embodiment. In some embodiments, the second cylindrical portion 117 is an integral component of the second body shell 111 (e.g., it is a molded component of the second body shell 111). In other embodiments, the second cylindrical portion 117 is a separate component that is snapped onto (or otherwise coupled to) the second body shell 111 such that is surrounds the plurality of optical fiber sub-units 144.

The flange portion 123 includes a slot 127 to receive crimp body straps 150 and crimp bodies 170 of the plurality of cable assemblies 160, which are described in more detail below. Notches 135 are also provided on opposite sides of the slot 127 to receive locking pins 152, as described in more detail below.

The first body shell 108 has a body portion 122 and a flange portion 119 that shaped to correspond to the shape of the body portion 112 and the flange portion 123 of the second body shell 111. The flange portion 119 includes a slot 129 that cooperates with the slot 127 of the flange portion 123 of the second body shell 111 to form an opening through which the crimp body straps 150 and the crimp bodies 170 are disposed.

The flange portion 119 of the first body shell 108 also includes notches 121 on opposite sides of the slot 127. These notches 121 cooperate with the notches 135 of the second body shell 111 to form openings through which the locking pins 152 are disposed, as described in more detail below.

Still referring to FIG. 2, as well as FIGS. 1, 3 and 4, the pivot arm 101 of the example fiber optic connector assembly 100 includes a first pivot arm shell 115 and a second pivot arm shell 125. The first pivot arm shell 115 is configured to mate with, and be secured to, the second pivot arm shell 125. Any engagement mechanism may be provided to secure the first pivot arm shell 115 to the second pivot arm shell 125. In the illustrated example, the first pivot arm shell 115 includes at least one tab 128 extending therefrom, and the second pivot arm shell 125 includes at least one slot 127 configured to receive the at least one tab 128 of the first pivot arm shell 115. In this manner, the first pivot arm shell 115 includes male engagement features in the form of tabs 128 and the second pivot arm shell 125 includes female engagement features in the form of slots 127. The tabs 128 may be mated to the slots 127 by a snap fit or an interference fit, for example. In some embodiments, an adhesive may also be utilized.

The first pivot arm shell 115 includes a semi-cylindrical recess 116. Similarly, the second pivot arm shell 125 also includes a corresponding semi-cylindrical recess 126. When the first pivot arm shell 115 is mated to the second pivot arm shell 125, the semi-cylindrical recess 116 of the first pivot arm shell 115 and the semi-cylindrical recess 126 of the second pivot arm shell 125 define a cylindrical channel. The first pivot arm shell 115 is mated to the second pivot arm shell 125 such that the first cylindrical portion 114 and the second cylindrical portion 117 of the second body shell 111 is disposed within the cylindrical channel defined by the semi-cylindrical recesses 116, 126 of the first and second pivot arm shells 115, 125. In this manner, the pivot arm 101 is secured to the body 110 such that the pivot arm 101 is rotatable about the first and second cylindrical portions 114, 117 of the second body shell 111.

FIGS. 3 and 4 illustrate how the pivot arm 101 rotates about the body 110. It is noted that FIGS. 3 and 4 illustrate the fiber optic connector assembly 100 with the first body shell 108 removed. In FIG. 3, the pivot arm 101 is in a middle or neutral position. In FIG. 4, the pivot arm 101 has been so that it is in a first position (e.g., a left position). The pivot arm 101 may include interior features such that pivot arm 101 is maintained at particular positions, such as positions that are ninety degrees with respect to one another. In this manner, the pivot arm 101 may be locked at the desired position.

As shown in FIG. 3, the interior surface 147 of the first pivot arm shell 115 and the second pivot arm shell 125 is scalloped or otherwise shaped such that it corresponds to a shape of the outer jacket 142 of the fiber optic cable 140.

It should be understood that the example body 110 with a pivot arm 101 may be utilized in a wide variety of optical connector configurations, and that embodiments described herein are not limited to the cable assemblies 160, crimp body straps 150, locking pins 152, and housing 130 as described in more detail below.

Figure 5:
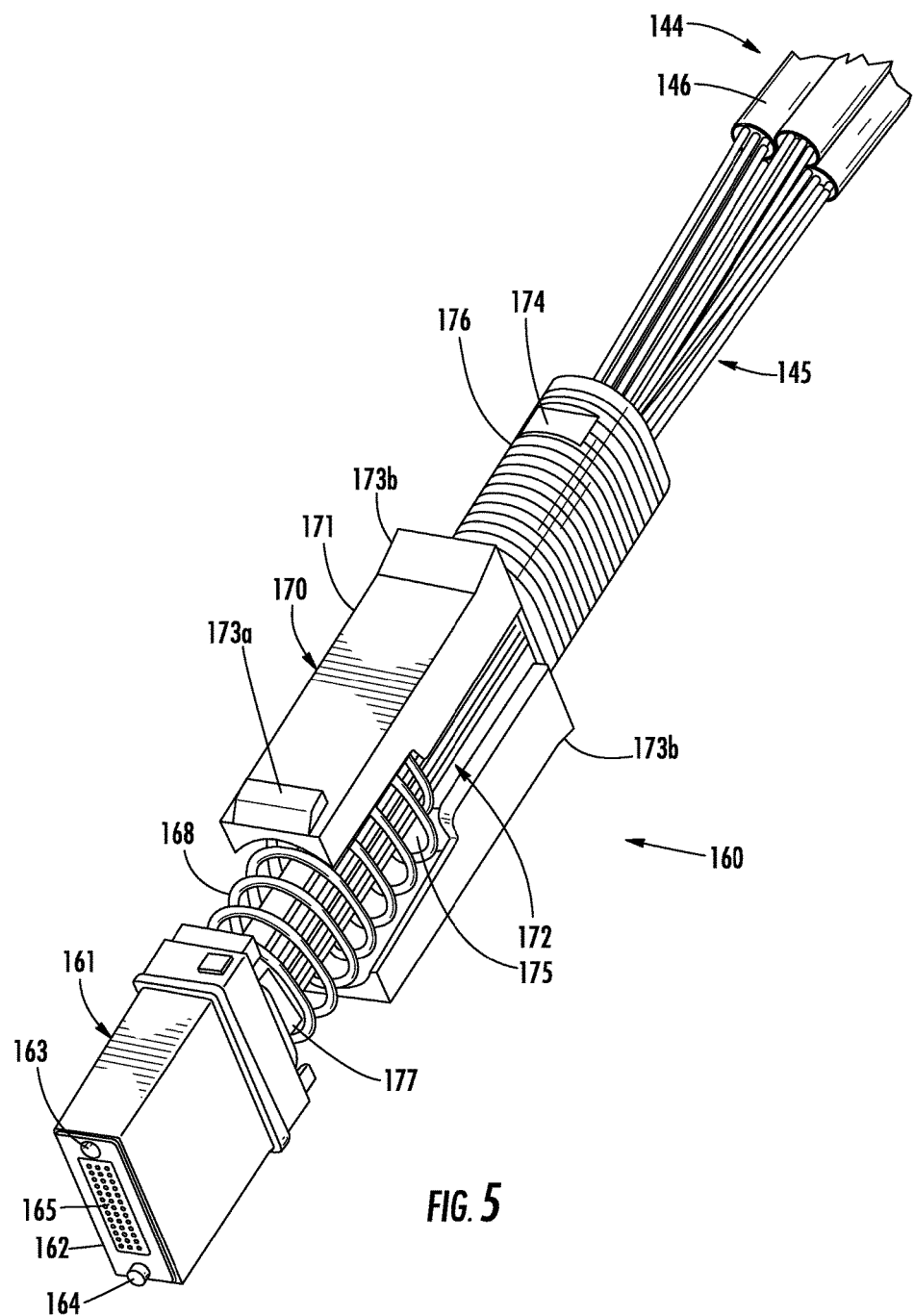
FIG. 5 is a partial, assembled view of an example cable assembly of the example fiber optic cable assembly illustrated in FIG. 1 according to one or more embodiments described and illustrated herein.

Referring now to FIG. 5, a termination end of an example individual cable assembly 160 is schematically illustrated. The example cable assembly 160 comprises a ferrule 161, a ferrule boot 177 coupled to the ferrule 161, a spring 168, and a crimp body 170. The crimp body 170 has a main body 171, a fiber insertion portion 176 and a channel 172 disposed therein. The spring 168 is disposed in the channel 172 and is also coupled to the ferrule 161. A wall 175 within the channel 172 provides a backstop for the spring 168. Inner jackets and/or insulations 146 of the plurality of optical fiber sub-units 144 are stripped to reveal loose optical fibers 145. The loose optical fibers 145 are disposed through the fiber insertion portion 176 and the channel 172 of the crimp body 170, the ferrule boot 177, and the spring 168.

The main body 171 of the example crimp body 170 further includes features 173a, 173b that are configured to engage interior features of the housing 130 to secure the crimp bodies 170 within the housing 130. The fiber insertion portion 176 of the example crimp body 170 includes two slots 174 configured to engage corresponding locking features 167 of the crimp body straps 150 as described in more detail below with respect to FIG. 6. It is noted that only one slot 174 is visible in FIG. 5. It should be understood that more or fewer than two slots 174 or other engagement features may be utilized to secure the crimp bodies 170 to the crimp body straps 150.

The ends of the optical fibers 145 are coupled to the ferrule 161. The ferrule 161 may be any known or yet-to-be-developed lens ferrule. As a non-limiting example, the ferrule 161 may be a PrizmMT lensed MT-type ferrule sold by US Conec of Hickory, N.C. The ferrule 161 should be capable of terminating a plurality of optical fibers 145. As a non-limiting example, the ferrule 161 may terminate forty eight optical fibers 145. However, the number of optical fibers the ferrule 161 terminates may depend on the particular application.

The ferrule 161 includes a mating surface 162 that is configured to mate with a corresponding mating surface of a mated receptacle. The example ferrule 161 depicted in FIG. 5 further includes an optical interface 165 comprising a plurality of lenses. The plurality of lenses is optically coupled to the plurality of optical fibers 145. The term "optically coupled" means that optical signals are capable of passing between two mated components, such as a lens and an optical fiber, for example.

The mating surface 162 of the ferrule 161 may also include, in some embodiments, one or more mating features operable to mate with corresponding mating features of the receptacle. In the illustrated embodiment, the mating features are configured as an alignment bore 163 and an alignment pin 164 that are configured to mate with a corresponding alignment pin and a corresponding alignment bore, respectively, of the receptacle. Alternatively, the mating surface 162 of the ferrule 161 may include only pins, or only bores. Still further, the mating surface 162 of the ferrule 161 may include more than two alignment pins and/or alignment bores.

Figure 6:
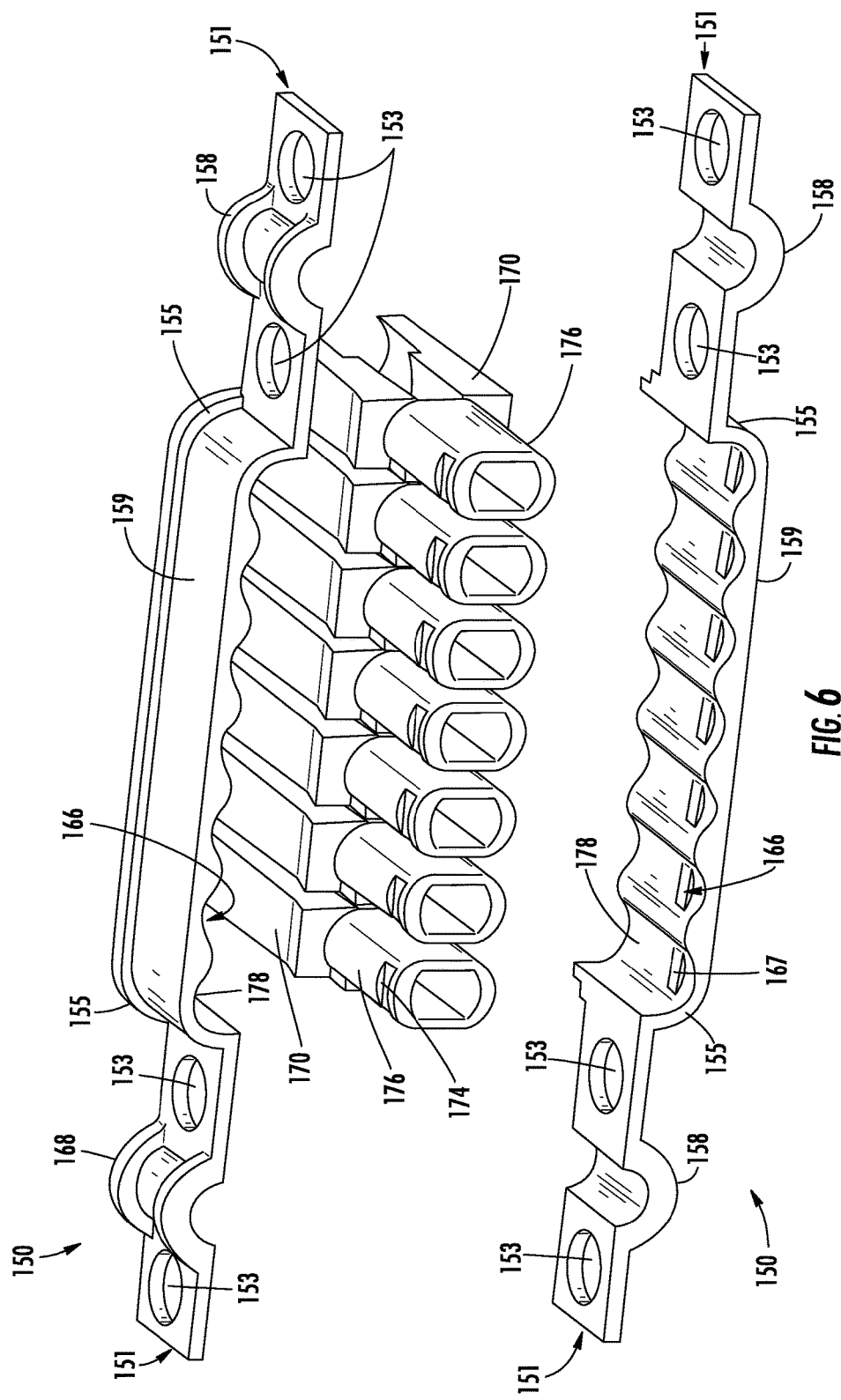
FIG. 6 is an exploded, perspective view of a plurality of crimp bodies and two crimp body straps according to one or more embodiments described and illustrated herein.
Figure 7:
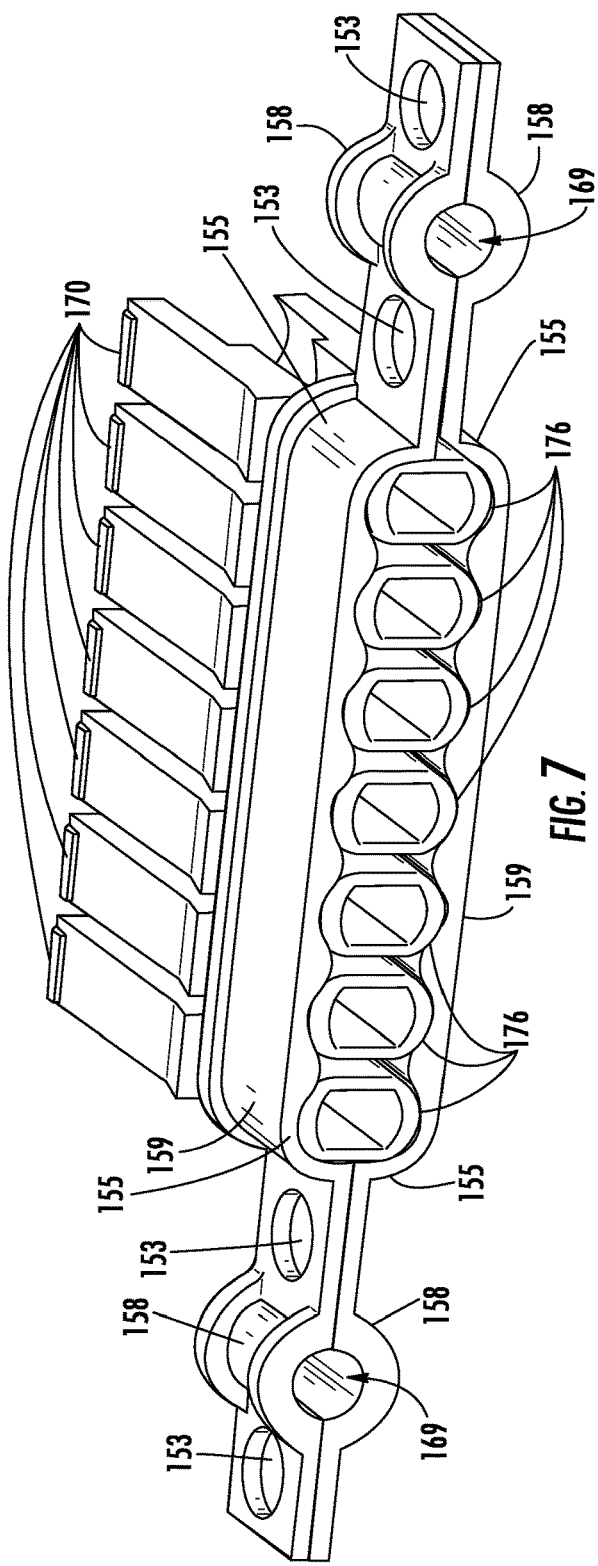
FIG. 7 is an exploded, assembled view of the plurality of crimp bodies and two crimp body straps illustrated in FIG. 6 according to one or more embodiments described and illustrated herein.

Referring now to FIGS. 6 and 7, a plurality of crimp bodies 170 and two crimp body straps 150 are schematically illustrated. FIG. 6 depicts the two crimp body straps 150 and the plurality of crimp bodies 170 in an exploded view. FIG. 7 depicts the two crimp body straps 150 and the plurality of crimp bodies 170 in an assembled view. Each example crimp body strap 150 includes an engagement portion 159 and two end portions 151 (i.e., a first end portion and a second end portion) on opposite sides of the engagement portion 159. The crimp body straps 150 cooperate to secure and lock the plurality of crimp bodies 170 together for inclusion in the fiber optic connector assembly 100.

The engagement portion 159 of each crimp body strap 150 has a wall 155 extending away from each of the two end portions 151 such that when the end portions 151 two crimp body straps 150 are brought into contact with one another, the engagement portions 159 of the crimp body straps 150 define an opening in which the fiber insertion portions 176 of the crimp bodies 170 are disposed.

In the illustrated example, the engagement portion 159 of the crimp body straps 150 have an interior surface 166 comprising a plurality of grooves 178 that are shaped to match the contour of the fiber insertion portion 176 of the crimp bodies 170. The fiber insertion portion 176 of an individual crimp body 170 is disposed within an individual groove 178 of each crimp body strap 150 when the crimp bodies 170 and the crimp body straps 150 are in an assembled state.

As noted above, the example crimp bodies 170 further include two slots 174 disposed on opposite sides of the fiber insertion portion 176. It is noted that only one slot 174 of each crimp body 170 is visible in FIG. 6. A corresponding locking feature 167 is disposed within each groove 178 of the crimp body straps 150. The locking features 167 are configured to be disposed within the slots 174 when the crimp bodies 170 and the crimp body straps 150 are in an assembled state. The slots 174 and the locking features 167 cooperate to lock the crimp bodies 170 with respect to the crimp body straps 150 and prevent their movement when disposed between the crimp body straps 150. It should be understood that other features may also be utilized to lock the crimp bodies 170 between the crimp body straps 150, such as pins and bores, for example. Accordingly, embodiments are not limited to the slots 174 and locking features 167 illustrated in FIG. 6.

Referring to FIGS. 4, 6 and 7, the end portions 151 of the crimp body straps 150 extend from the engagement portion 159. The end portions 151 may take on a variety of configurations. In the illustrated example, each end portion 151 comprises through holes 153 positioned and sized to receive the posts 124 of the second body shell 111. The number, size and placement of the through holes 153 will depend on the number, size, and placement of the posts 124 of the second body shell 111. When the end portions 151 of the two crimp body straps 150 are brought into contact with each other as shown in FIG. 7, and then positioned on the second body shell 111 as shown in FIG. 4, the posts 124 are disposed within the through holes 153 of the crimp body straps 150. The first body shell 108 is then coupled the second body shell 111 to secure the crimp body straps 150 and the plurality of crimp bodies 170 between the second body shell 111 and the first body shell 108.

The end portions 151 may also include a curved portion 158 that is configured to align with an opposing curved portion 158 of a corresponding crimp body strap 150 and define locking pin channels 169 (i.e., a first locking pin channel and a second locking pin channel). As shown in FIGS. 3 and 4, a locking pin 152 may be disposed within each locking pin channel 169. The locking pins 152 may be provided to lock the fiber optic connector assembly 100 in a mated state with a corresponding receptacle. It should be understood that other embodiments may not include curved portions 158 or locking pins.

It should be also understood that components or features other than the crimp body straps 150 may be utilized to gang the crimp bodies 170 together. For example, mechanical features may be provided within the crimp bodies 170 themselves to gang the crimp bodies 170 together, such as mating snap features, for example. Other configurations are also possible.

Figure 9:
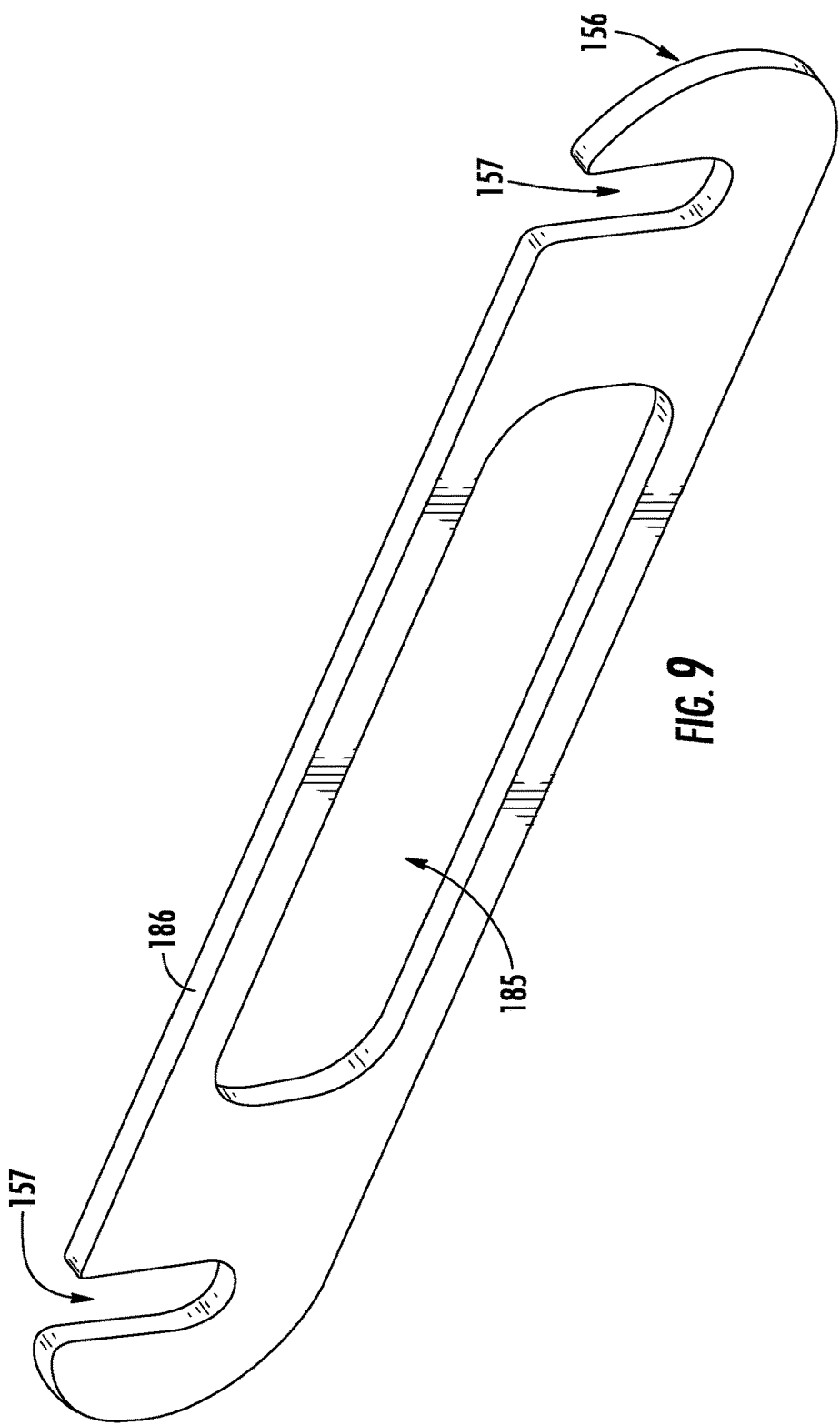
FIG. 9 is a perspective view of an example retention plate of the example fiber optic connector assembly illustrated in FIG. 1 according to one or more embodiments described and illustrated herein.

A retention plate 156 may also be provided. FIG. 9 illustrates an example retention plate 156 that may be disposed about the fiber insertion portions 176 of the crimp bodies 170 between the crimp body straps 150 and the main body 171 of the crimp bodies 170. The example retention plate 156 includes an opening 185 configured to receive the fiber insertion portions 176 of the plurality of crimp bodies 170. The example retention plate 156 further includes notches 157 that are adjacent opposite sides of opening 185 (i.e., a first notch adjacent a first side of the opening and a second notch adjacent a second side of the opening). As shown in FIGS. 2-4, the locking pins 152 are disposed within the notches 157 of the retention plate 156. Alternatively, the notches may be configured as through holes. Or, in connectors that do not utilize the locking pins 152, the retention plate 156 may not include notches or through holes.

The retention plate 156 may be fabricated from any suitably rigid material, such as plastic or metal.

Figure 8:
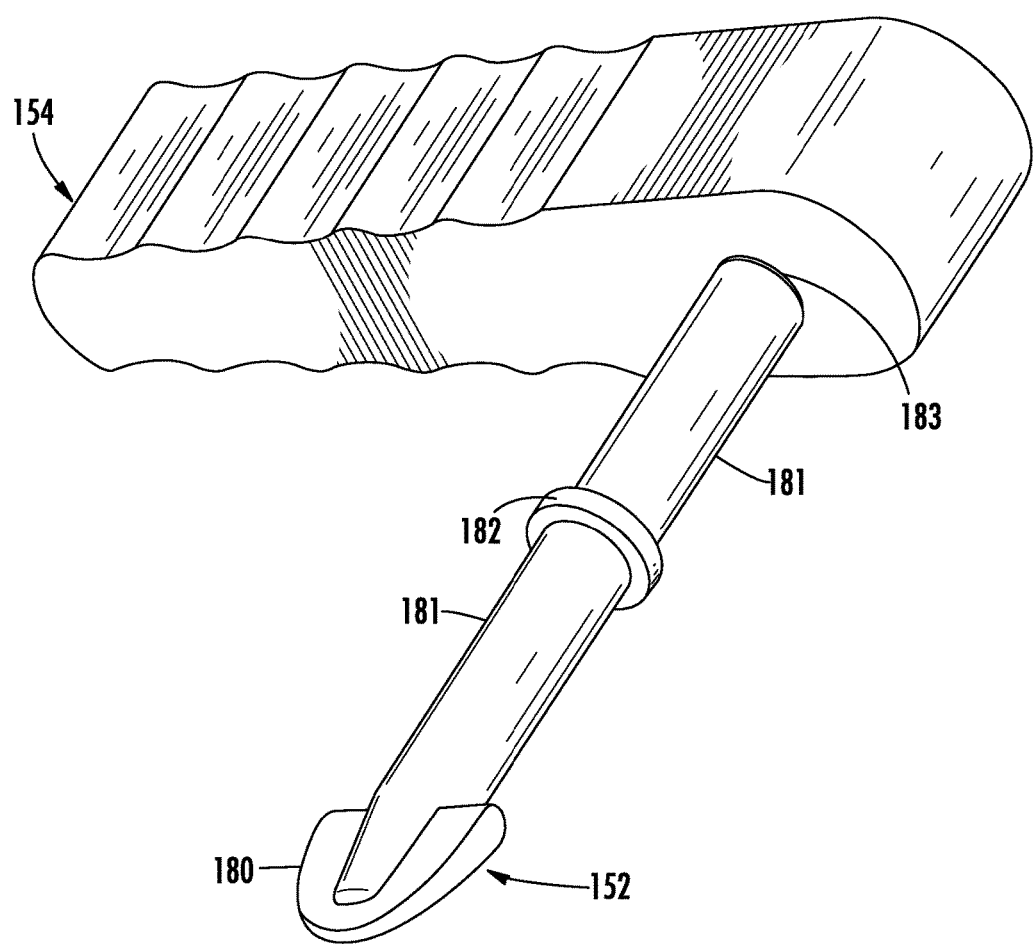
FIG. 8 is a perspective view of an example locking pin and an example latch of the example fiber optic connector assembly illustrated in FIG. 1 according to one or more embodiments described and illustrated herein.

The example fiber optic connector assembly 100 includes two locking pins 152 and two corresponding latches 154. It should be understood that the fiber optic connector assembly 100 may also not include locking pins and/or latches. FIG. 8 illustrates an example locking pin 152 and corresponding latch 154. The example locking pin 152 is configured as a quarter-turn pin. As described in more detail below with respect to FIGS. 13A and 13B when the locking pins 152 are in a first orientation, it is insertable into a receptacle. After inserting the locking pins 152 into the receptacle, the locking pin 152 may be turned ninety degrees using the latches 154 to lock the fiber optic connector assembly 100 to the receptacle.

The illustrated locking pin 152 includes a stem 181, a spade 180 at one end of the stem 181, and a stop 182. The end of the stem 181 opposite from the spade 180 is disposed within a hole 183 of the latch 154. The stop 182 may be disposed between the crimp body straps 150 and the retention plate 156 to provide a gap therebetween. Other latching mechanisms used to secure the fiber optic connector assembly 100 to a receptacle or adapter are contemplated, such as thumb screws or integrated latching features as non-limiting examples.

Referring specifically to FIGS. 2-4, when the crimp body straps 150, the retention plate 156, and the plurality of cable assemblies 160 are in an assembled state, the assembly is coupled to the second body shell 111 such that a portion of the retention plate 156 is disposed within a slot 118 within the flange portion 123 of the second body shell 111, and the posts 124 are disposed within the through holes 153 of the crimp body straps 150. The plurality of crimp bodies 170 and the ferrules 161 are positioned and secured within the housing 130 such that the mating surfaces 162 of the ferrules 161 are exposed through the openings 131 of the housing 130. The plurality of cable assemblies 160 may be secured within the housing by mechanical features and/or by the use of an adhesive. The first body shell 108 may then be coupled to the second body shell 111 to provide a fully assembled fiber optic connector assembly 100, as shown in FIG. 1.

Figure 10:
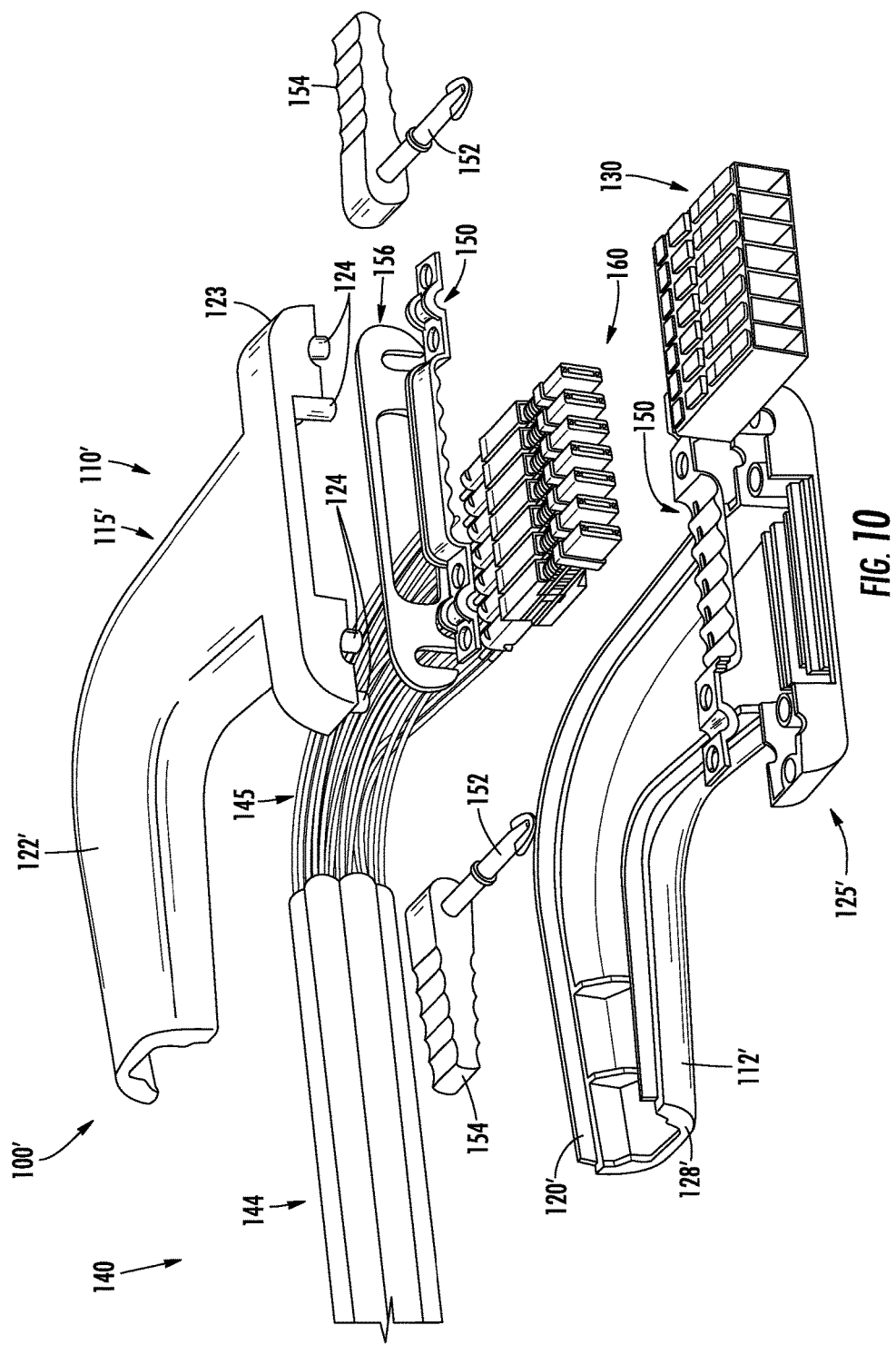
FIG. 10 is a perspective view of an example fiber optic cable assembly according to one or more embodiments described and illustrated herein.

An alternative fiber optic connector assembly 100' is schematically depicted in FIG. 10. The example fiber optic connector assembly 100' does not include a rotatable pivot arm 101 as described above. Rather, the fiber optic connector assembly 100' illustrated in FIG. 10 includes a fixed body 110 that is not changeable once the fiber optic connector assembly 100' is assembled. The body 110' comprises a first body shell 115' and a second body shell 125', each of which includes a turn (e.g., a ninety degree turn) for directing the fiber optic cable 140. The direction from which the fiber optic cable 140 enters the connector (e.g., either the right or the left) depends on the orientation of the first body shell 115' and the second body shell 125' with respect to the remaining components of fiber optic connector assembly 100'. For example, when the fiber optic cable 140 is routed from the left toward the fiber optic connector assembly 100' as shown in FIG. 10, the first body shell 115' is positioned above the second body shell 125'. However, when the fiber optic cable 140 is routed from the right toward the fiber optic connector assembly 100' (e.g., in a direction opposite that shown in FIG. 10), the first body shell 115' is positioned below the second body shell 125' (i.e., the positions of the first body shell 115' and the second body shell 125' are reversed to those shown in FIG. 10).

Figure 11:
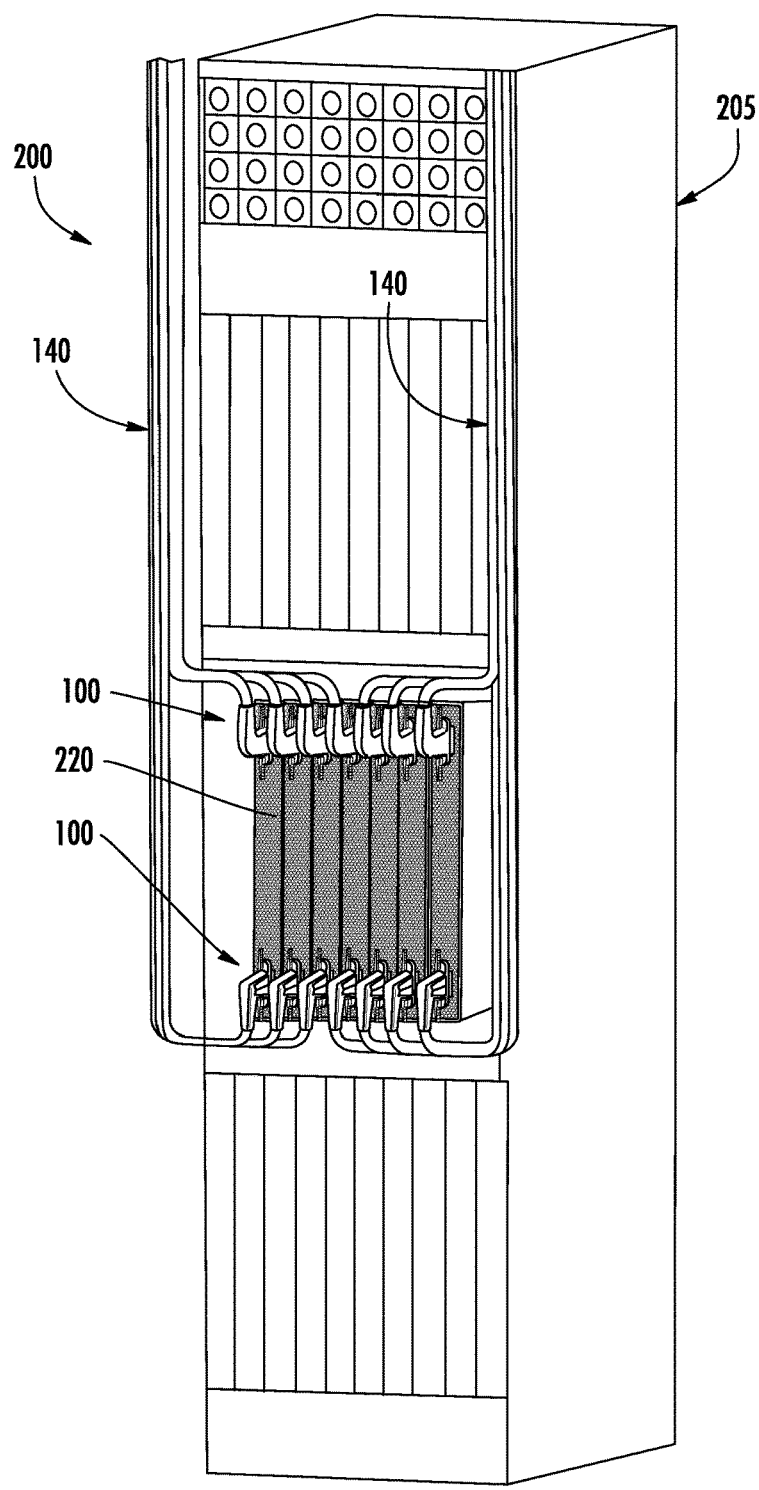
FIG. 11 is a perspective view of an example datacenter cabinet according to one or more embodiments described and illustrated herein.

The mass fiber optic connector assemblies 100 described herein are capable of optically coupling a large number of optical fibers to corresponding optical components. Referring now to FIG. 11, and as an example and not a limitation, the example fiber optic connector assemblies 100 described herein may be utilized to connect optical fibers to optical receptacles within routers 220 of a rack-based datacenter cabinet 200. As an example and not a limitation, each router 220 may be configured as a 1U rackmount router. It should be understood that embodiments are not limited to 1U rackmount routers, and that other sizes are possible, such as 2U, 3U, 4U, etc. Fiber optic cables 140 that are terminated by the fiber optic connector assemblies 100 described herein may be routed from the ceiling or the floor for connection to the routers 220 within the cabinet.

FIG. 12 illustrates a single 1U router 220 of the datacenter cabinet 200 depicted in FIG. 11. The example router 220 includes a housing 221 and a grate 222. Two receptacles 330 are positioned at openings within the grate 222. It should be understood that the routers 220 depicted in FIGS. 11 and 12 are provided merely for illustrative purposes. As described above, the pivot arm 101 of the fiber optic connector assembly 100 may be rotated to a desired position depending on how the fiber optic cables 140 are routed to the router 220.

Figure 13A:
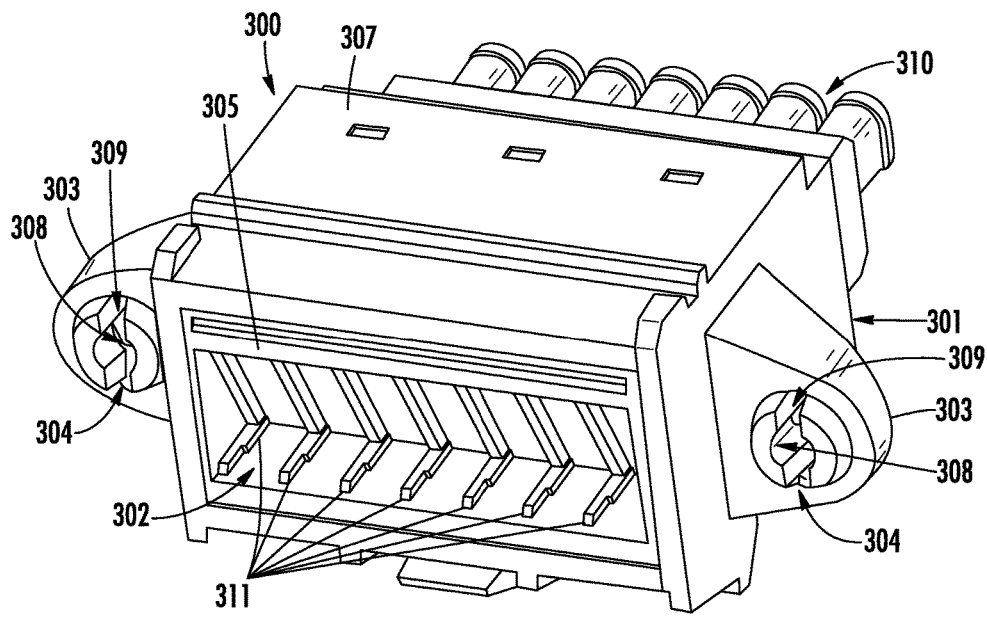
FIG. 13A is a front perspective view of an example receptacle operable to mate with the example fiber optic connector assembly illustrated in FIG. 1 according to one or more embodiments described and illustrated herein.
Figure 13B:
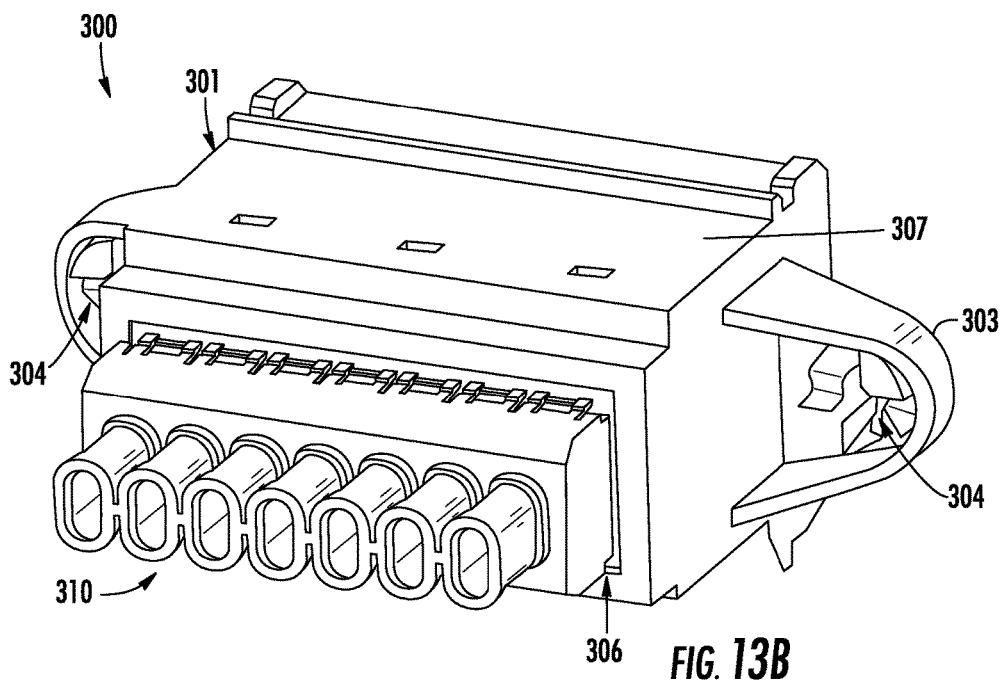
FIG. 13B is a rear perspective view of the example receptacle illustrated in FIG. 13A.
Figure 13C:
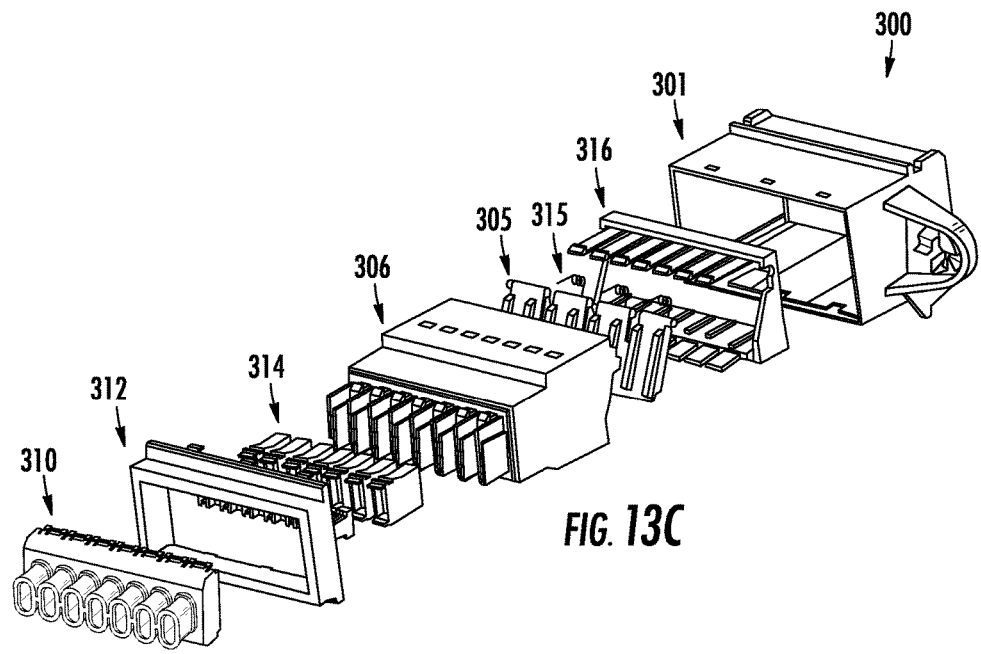
FIG. 13C is an exploded, rear perspective view of the example receptacle illustrated in FIGS. 13A and 13B according to one or more embodiments described and illustrated herein.
Figure 13D:
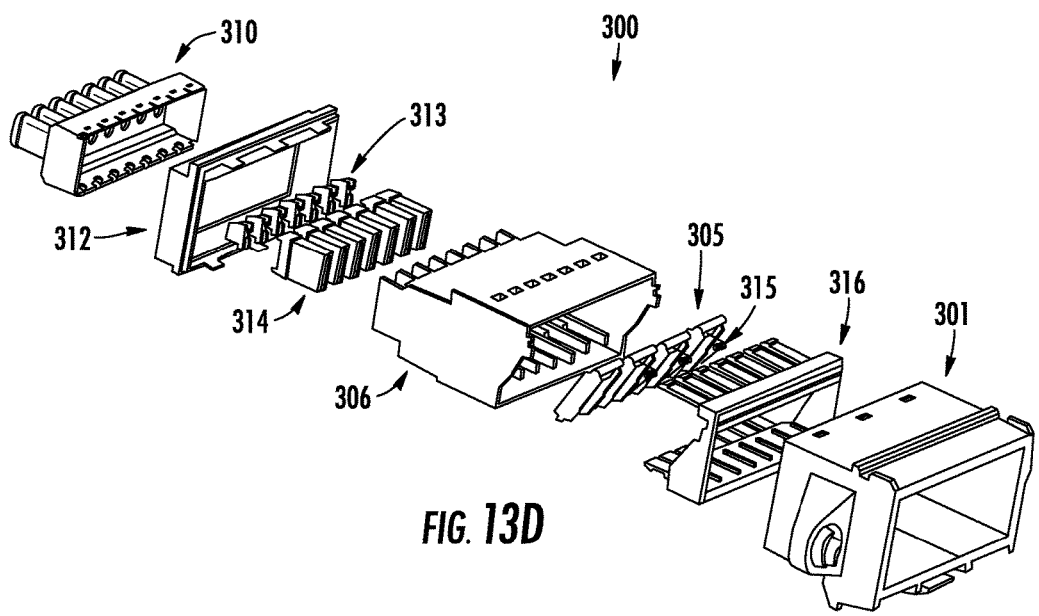
FIG. 13D is an exploded, front perspective view of the example receptacle illustrated in FIGS. 13A-13C according to one or more embodiments described and illustrated herein.

FIGS. 13A-13D schematically depict a front a rear view of an example receptacle 300, respectively. FIGS. 13A and 13B are front and rear perspective views of the assembled receptacle 300, respectively. FIGS. 13C and 13D are alternate perspective exploded views of the receptacle 300. It should be understood that other receptacle configurations are also possible.

The example receptacle 300 generally includes an outer sleeve 301, an inner sleeve 316, a shutter door 305, an inner housing 306, a plurality of ferrules 314, a plurality of ferrule boots 313, a rear bezel 312, and a crimp housing 310. The outer sleeve 301 may be made of any suitably rigid material. In some applications, the outer sleeve 301 may be made of a die cast metal to provide electro-magnetic interference protection, for example. The inner sleeve 316, the shutter door 305 and the rear bezel 312 may also be made of a die cast metal, for example.

The inner sleeve 306 is disposed within the outer sleeve 301, as shown in FIGS. 13C and 13D. The shutter door 305 is disposed within the inner sleeve 316, and is biased in a closed position using springs 315 that rotatably couple the shutter door 305 to the inner sleeve 316. When the fiber optic connector assembly 100 is inserted into the outer sleeve 301 of the receptacle 300, the fiber optic connector assembly 100 pushes the shutter door 305 to an opened position. When the fiber optic connector assembly 100 is removed from the outer sleeve 301, the shutter door 305 automatically closes.

As an example, the shutter door 305 may include rib features 311 that engage corresponding channel features 132 positioned on the housing 130 of the fiber optic connector assembly, as shown in FIGS. 3 and 4. The interaction between the rib features 311 of the shutter door 305 and the channel features 132 of the housing provides coarse alignment between the fiber optic connector assembly and the receptacle 300.

The inner housing 306 is disposed within the inner sleeve 316 and has an angled front opening that cooperates with the inner sleeve 316 to provide a pivot point for the shutter door 305. The plurality of ferrules 314 and the ferrule boots 313 are disposed within the inner housing 306. The rear bezel 312 locks the inner sleeve 316, the shutter door 305, and the inner housing 306 within the outer sleeve 301. The crimp housing 310, which receives pluralities of optical fibers similar to the crimp bodies 170 described above, may be coupled to the inner housing, such as by the use of mechanical features that provide a snap fit, for example.

Referring generally to FIGS. 13A-13D, the outer sleeve 301 includes two flange portions 303 extending from opposite sides of a body 307 that defines an opening 302 for insertion of the fiber optic connector assembly 100. The two flange portions 303 each include a feature 304 for receiving the locking pin 152 of the fiber optic connector assembly 100. Each feature 304 includes a hole 308 sized to receive the stem 181 of the locking pin 152, and a slot 309 intersecting the hole 308 to receive the spade 180 of the locking pin 152. When the fiber optic connector assembly 100 is being inserted into the receptacle 300, the locking pins 152 are oriented such that the spade 180 may be inserted through the slot 309 of the feature 304. Once the locking pins 152 are fully inserted into the features 304, the locking pins 152 are rotated ninety degrees (e.g., using latches 154) to lock the fiber optic connector assembly 100 to the receptacle 300. To remove the fiber optic connector assembly 100 from the receptacle 300, the locking pins 152 are rotated back to the original position such that the spade 180 is in line with the slot 309 so that the locking pins 152 may be pulled through the features 304.

Figure 14A:
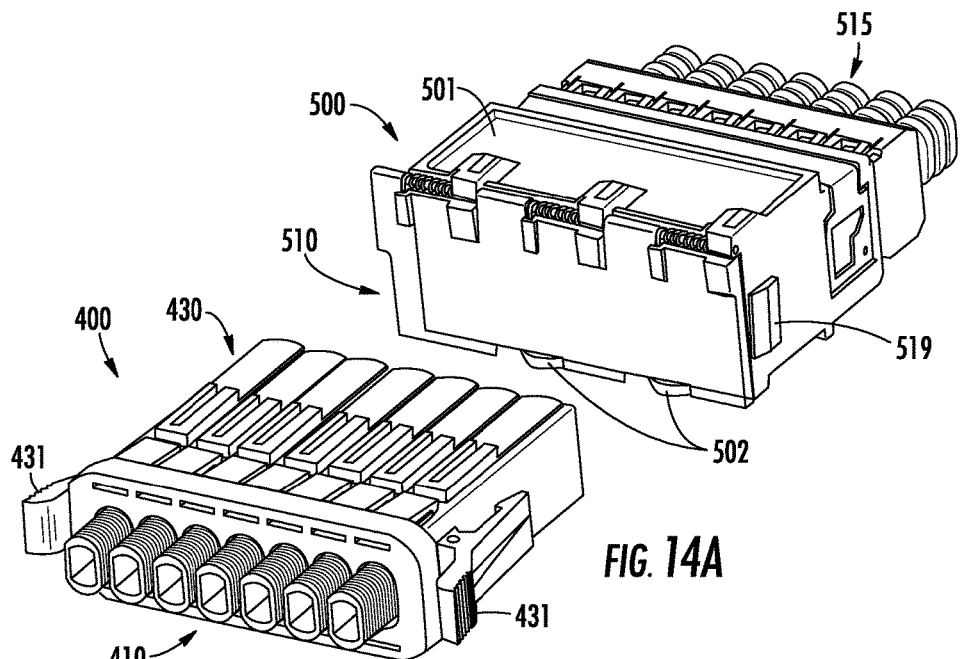
FIG. 14A is a perspective view of an example fiber optic connector assembly and a receptacle in an unmated state according to one or more embodiments described and illustrated herein.
Figure 14B:
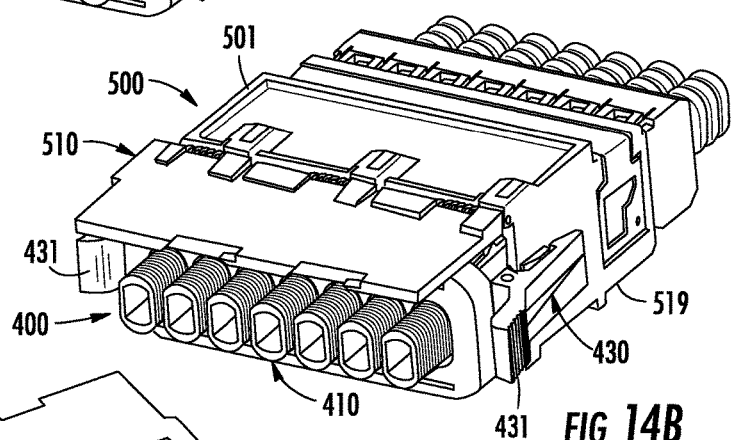
FIG. 14B is a front perspective view of the example fiber optic connector assembly and the receptacle illustrated in FIG. 14A in a mated state.
Figure 14C:
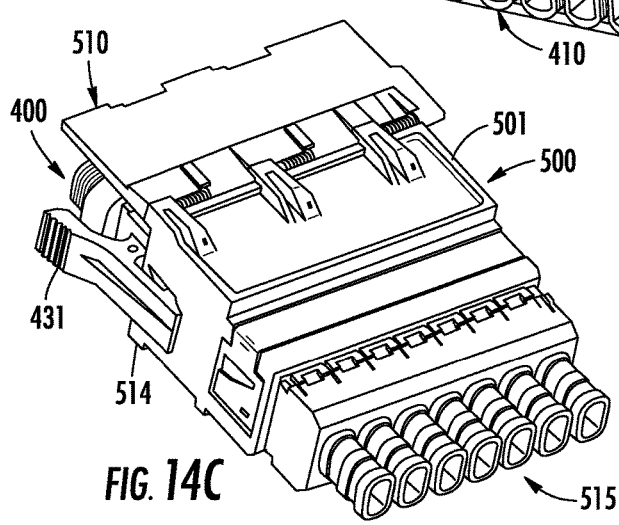
FIG. 14C is a rear perspective view of the example fiber optic connector assembly and the receptacle illustrated in FIGS. 14A and 14B in a mated state.

Referring now to FIGS. 14A-14C, an alternative fiber optic connector assembly 400 and an alternative receptacle 500 are schematically illustrated. FIG. 14A depicts the fiber optic connector assembly 400 and the receptacle 500 in an unmated state, while FIGS. 14B and 14C depict alternate perspective views of the fiber optic connector assembly 400 and the receptacle in a mated state.

The receptacle 500 generally includes a body 501, a shutter door 510 coupled to the body 501, and a crimp housing 515. Although not visible in FIGS. 14A-14C, the receptacle 500 further comprises a plurality of ferrules disposed within the body 501, and a plurality of optical fibers that enter the body 501 through the crimp housing 515. The shutter door 510 of the receptacle 500 depicted in FIGS. 14A-14C does not require direct interaction with the fiber optic connector assembly 400 to open and close. Rather, the shutter door 510 is opened and closed manually, as described below and illustrated in FIGS. 15A-15C and 16A-16C.

The example fiber optic connector assembly 400 depicted in FIGS. 14A-14C generally comprises a housing 430 and a crimp housing 410. Although not shown in FIGS. 14A-14C, the fiber optic connector assembly 400 may further include a plurality of ferrules an pluralities of optical fibers within the housing 430. The housing 430 further includes latching arms 431 that are operable to engage features 519 disposed on the side of the body 501 of the receptacle 500. The latching arms 431 and the features 519 maintain the fiber optic connector assembly 400 in a mated relationship with the receptacle 500, as shown in FIGS. 14B and 14C.

Figure 15B:
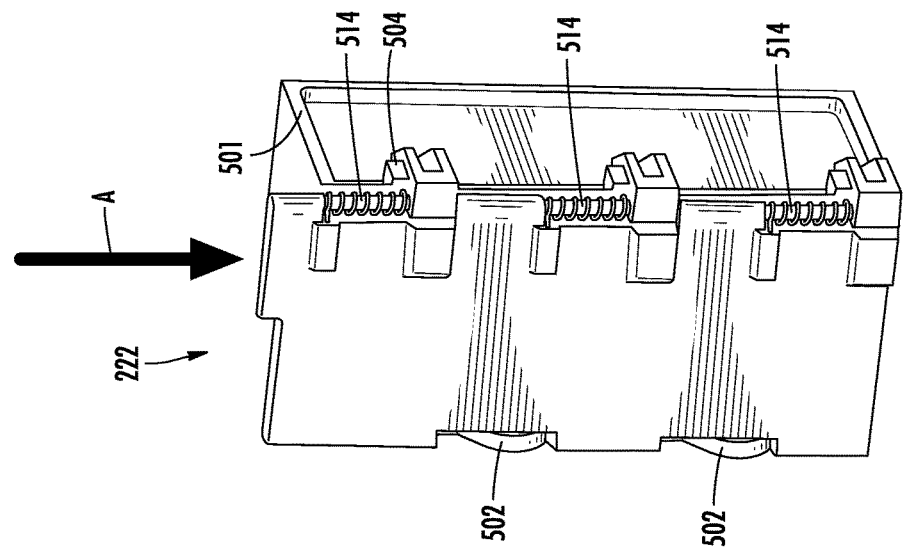
FIGS. 15A and 15B are alternate perspective views of the example receptacle illustrated in FIGS. 14A-14C disposed in a router according to one or more embodiments described and illustrated herein.
Figure 15A:
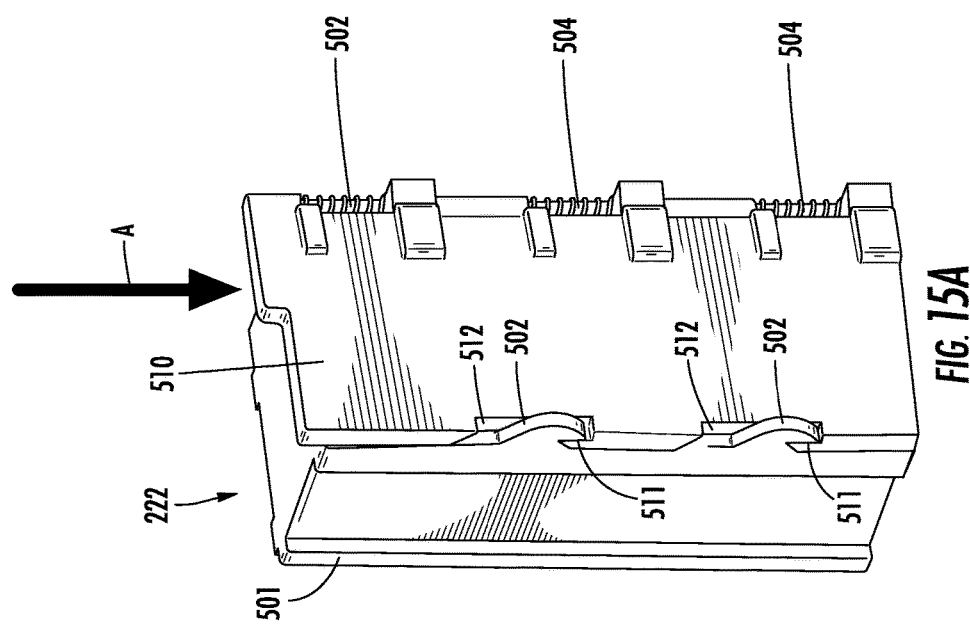
Figure 15C:
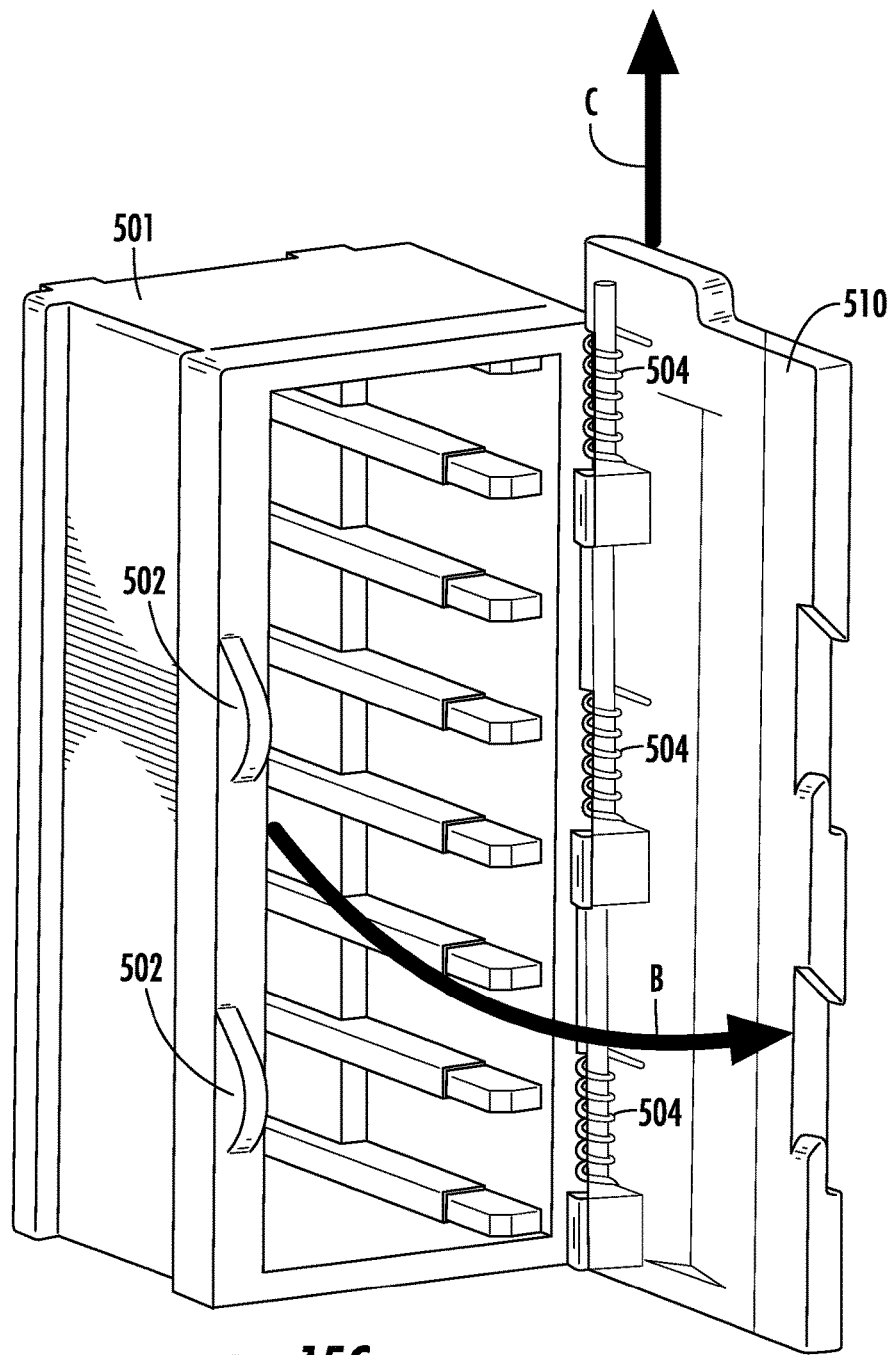
FIG. 15C is a perspective view of the example receptacle illustrated in FIGS. 15A and 15B with a shutter door in an opened position according to one or more embodiments described and illustrated herein.

FIGS. 15A-15C schematically illustrate how the shutter door 510 is opened. Referring to FIGS. 15A and 15B, the shutter door 510 is pivotably coupled to the body 501 by springs 504. The shutter door 510 includes notches 512 that receive hooks 502. The shutter door 510 further includes engagement regions 511 at the notches 512 that have a reduced thickness. When the shutter door 510 is in a closed state, the hooks 502 are disposed on the engagement regions 511. To open the shutter door 510, the user pushes down on the shutter door 510, such as at a tab 513, as shown by arrow A. This causes the shutter door 510 to move downward in the direction of arrow A, which thereby causes the hooks to clear the engagement regions 511 and be positioned within the notches 512. The torsion spring force provided by the springs 504 causes the shutter door to swing open, as shown in FIG. 15C by arrow B, and upward as shown by arrow C.

FIGS. 16A-16C illustrate how the shutter door 510 is closed with respect to the body 501. As shown in FIG. 16A, the shutter door 510 is closed in a direction indicated by arrow D as shown in FIG. 16A against the torsion spring force provided by the springs 504. Additionally, the shutter door 510 is pushed down (e.g., at tab 513) as indicated by arrow A to position the hooks 502 within the notches 512 (FIG. 16B). As shown in FIG. 16C, once reaching the end of travel, the compressed springs 504 force the shutter door 510 upward as shown by arrow C which causes the hooks 502 to be positioned against the engagement regions 511 of the shutter door 510, thereby locking the shutter door 510 closed.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:
1. A fiber optic connector subassembly comprising:
   a body comprising:
      a first body shell; and
      a second body shell comprising a joint portion, wherein the first body shell is coupled to the second body shell; and
   a pivot arm rotatably coupled to the joint portion of the second body shell, the pivot arm comprising a first pivot arm shell and a second pivot arm shell coupled to the first pivot arm shell, wherein:
the at least one joint portion comprises at least one cylindrical portion;
each of the first pivot arm shell and the second pivot arm shell comprises a semi-cylindrical recess;
the semi-cylindrical recess of the first pivot arm shell and the semi-cylindrical recess of the second pivot arm shell define a cylindrical channel when the first pivot arm shell is coupled to the second pivot arm shell; and
the at least one cylindrical portion of the second body shell is disposed within the cylindrical channel.

2. The fiber optic connector subassembly of claim 1, wherein:
the first pivot arm shell comprises at least one tab; and
the second pivot arm shell comprises at least one slot configured to receive the at least one tab of the first pivot arm shell when the second pivot arm shell is coupled to the first pivot arm shell.

3. The fiber optic connector subassembly of claim 2, wherein each of the first pivot arm shell and the second pivot arm shell comprises a scalloped interior surface.

4. The fiber optic connector subassembly of claim 1, wherein:
the second body shell comprises a plurality of posts;
the first body shell comprises a plurality of bores; and
the plurality of posts are disposed within the plurality of bores when the first body shell is coupled to the second body shell.

5. The fiber optic connector subassembly of claim 1, wherein the joint portion comprises a first cylindrical portion and a second cylindrical portion.

6. A fiber optic connector assembly comprising:
a plurality of cable assemblies, each cable assembly comprising:
a fiber optic cable comprising a plurality of optical fibers; and
a ferrule, wherein the plurality of optical fibers is coupled to the ferrule;
a housing that receives ferrules of the plurality of cable assemblies;
a body coupled to the housing, wherein: the body comprises a first body shell and a second body shell; the first body shell is coupled to the second body shell; the second body shell comprises at least one cylindrical portion; and at least a portion of the plurality of cable assemblies is disposed within the body; and
a pivot arm rotatably coupled to the body the pivot arm comprising a first pivot arm shell and a second pivot arm shell coupled to the first pivot arm shell, wherein:
the plurality of optical fibers of each cable assembly are disposed within the pivot arm;
each of the first pivot arm shell and the second pivot arm shell comprises a semi-cylindrical recess;
the semi-cylindrical recess of the first pivot arm shell and the semi-cylindrical recess of the second pivot arm shell define a cylindrical channel when the first pivot arm shell is coupled to the second pivot arm shell; and
the at least one cylindrical portion of the second body shell is disposed within the cylindrical channel.

7. The fiber optic connector assembly of claim 6, wherein:
the first pivot arm shell comprises at least one tab; and
the second pivot arm shell comprises at least one slot configured to receive the at least one tab of the first pivot arm shell when the second pivot arm shell is coupled to the first pivot arm shell.

8. The fiber optic connector assembly of claim 7, wherein each of the first pivot arm shell and the second pivot arm shell comprises a scalloped interior surface.

9. The fiber optic connector assembly of claim 6, wherein:
the plurality of optical fibers of each cable assembly are disposed within the at least one cylindrical portion of the body; and
the pivot arm is rotably coupled to the at least one cylindrical portion of the body.

10. The fiber optic connector assembly of claim 6, wherein the at least one cylindrical portion comprises a first cylindrical portion and a second cylindrical portion.

11. The fiber optic connector assembly of claim 6, wherein:
the second body shell comprises a plurality of posts;
the first body shell comprises a plurality of bores; and
the plurality of posts are disposed within the plurality of bores when the first body shell is coupled to the second body shell.

12. The fiber optic connector assembly of claim 6, wherein:
the first pivot arm shell comprises at least one tab; and
the second pivot arm shell comprises at least one slot configured to receive the at least one tab of the first pivot arm shell when the second pivot arm shell is coupled to the first pivot arm shell.

13. The fiber optic connector assembly of claim 6, further comprising a first crimp body strap and a second crimp body strap, each of the first crimp body strap and the second crimp body strap comprising:
a engagement portion comprising a plurality of grooves; and
a first end portion and a second end portion, each of the first end portion and the second end portion comprising at least one through hole and a curved portion, wherein the first crimp body strap is coupled to the second crimp body strap such that the curved portion of the first end portion and the second end portion define a first locking pin channel and a second locking pin channel, respectively, and the first crimp body strap and the second crimp body strap is coupled to the body.

14. The fiber optic connector assembly of claim 13, wherein:
each cable assembly further comprises:
a crimp body;
a spring disposed within the crimp body, wherein the plurality of optical fibers of the cable assembly is disposed within the crimp body and the spring;
a portion of the crimp body of each cable assembly is disposed within an individual groove of the plurality of grooves of the first crimp body strap and the second crimp body strap; and
a portion of the crimp body of each cable assembly is disposed within the housing.

15. The fiber optic connector assembly of claim 14, wherein:
the body comprises a first body shell and a second body shell;
the second body shell comprises a plurality of posts;
the first body shell comprises a plurality of bores;
at least two of the plurality of posts are disposed within the through holes of the first crimp body strap and the second crimp body strap; and
the plurality of posts are disposed within the plurality of bores when the first body shell is coupled to the second body shell such that the first crimp body strap and the second crimp body strap are disposed between the first body shell and the second body shell.

16. The fiber optic connector assembly of claim 15, further comprising a retention plate comprising an opening, a first notch positioned adjacent a first side of the opening and a second notch positioned adjacent a second side of the opening, wherein:
   the retention plate is disposed within the second body shell; and
   the retention plate contacts the first crimp body strap and the second crimp body strap such that the plurality of cable assemblies are disposed within the opening of the retention plate.

17. The fiber optic connector assembly of claim 16, further comprising:
   a first locking pin disposed within the first notch of the retention plate and within the first locking pin channel defined by the first end portion of the first crimp body strap and the first end portion of the second crimp body strap;
   a second locking pin disposed within the second notch of the retention plate and within the second locking pin channel defined by the second end portion of the first crimp body strap and the second end portion of the second crimp body strap;
   a first latch coupled to the first locking pin; and
   a second latch coupled to the second locking pin.

18. A fiber optic connector assembly comprising:
   a plurality of cable assemblies, each cable assembly comprising:
      a fiber optic cable comprising a plurality of optical fiber sub-unit, each optical fiber sub-unit comprising a plurality of optical fibers;
      a crimp body;
      a spring disposed within the crimp body, wherein the plurality of optical fibers of the cable assembly is disposed within the crimp body and the spring; and
      a ferrule, wherein the plurality of optical fibers is coupled to the ferrule;
   a housing that receives the ferrules and portions of the crimp bodies of the plurality of cable assemblies;
   a body coupled to the housing, the body comprising:
      a first body shell; and
      a second body shell comprising at least one cylindrical portion, wherein the first body shell is coupled to the second body shell; and
   a pivot arm rotatably coupled to the at least one cylindrical portion of the second body shell, the pivot arm comprising a first pivot arm shell and a second pivot arm shell coupled to the first pivot arm shell, wherein:
      the optical fiber sub-unit of each cable assembly are disposed within the pivot arm;
      each of the first pivot arm shell and the second pivot arm shell comprises a semi-cylindrical recess;
      the semi-cylindrical recess of the first pivot arm shell and the semi-cylindrical recess of the second pivot arm shell define a cylindrical channel when the first pivot arm shell is coupled to the second pivot arm shell; and
      the at least one cylindrical portion of the second body shell is disposed within the cylindrical channel.

19. The fiber optic connector assembly of claim 18, wherein:
   the first pivot arm shell comprises at least one tab; and
   the second pivot arm shell comprises at least one slot configured to receive the at least one tab of the first pivot arm shell when the second pivot arm shell is coupled to the first pivot arm shell.

* * * * *

UNITED STATES PATENT AND TRADEMARK OFFICE
CERTIFICATE OF CORRECTION

PATENT NO. : 10,101,544 B2
APPLICATION NO. : 15/219744
DATED : October 16, 2018
INVENTOR(S) : Christopher Paul Lewallen et al.

Page 1 of 1

It is certified that error appears in the above-identified patent and that said Letters Patent is hereby corrected as shown below:

In the Claims

In Column 14, Line 10, Claim 9, delete "rotably" and insert -- rotatably --, therefor.

Signed and Sealed this
Eighth Day of December, 2020

Andrei Iancu
*Director of the United States Patent and Trademark Office*